(12) United States Patent
Daum et al.

(10) Patent No.: US 9,545,854 B2
(45) Date of Patent: Jan. 17, 2017

(54) SYSTEM AND METHOD FOR CONTROLLING AND POWERING A VEHICLE

(75) Inventors: Wolfgang Daum, Erie, PA (US); Ajith Kuttannair Kumar, Erie, PA (US); Glenn Robert Shaffer, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/487,057

(22) Filed: Jun. 1, 2012

(65) Prior Publication Data

US 2012/0316717 A1    Dec. 13, 2012

Related U.S. Application Data

(60) Provisional application No. 61/496,556, filed on Jun. 13, 2011.

(51) Int. Cl.
*B60L 11/18* (2006.01)
*B60W 50/00* (2006.01)
(Continued)

(52) U.S. Cl.
CPC .............. *B60L 11/1861* (2013.01); *B60K 6/46* (2013.01); *B60L 11/184* (2013.01);
(Continued)

(58) Field of Classification Search
USPC ............................................ 701/22; 320/109
See application file for complete search history.

(56) References Cited

U.S. PATENT DOCUMENTS

| 7,869,576 B1 * | 1/2011 | Rodkey | H04L 67/12 |
| | | | 320/107 |
| 8,054,038 B2 * | 11/2011 | Kelty | B60L 3/0046 |
| | | | 320/109 |

(Continued)

FOREIGN PATENT DOCUMENTS

| DE | 19519107 C1 | 4/1996 |
| EP | 1864849 A1 | 12/2007 |
| WO | 2010057987 A2 | 5/2010 |

OTHER PUBLICATIONS

Barth, Matthew, Simulation model performance analysis of a multiple station shared vehicle system, Transportation Research Part C (1999) p. 237-259, College of Engineering, Center for Environmental Research and Technology, University of California, Riverside, CA 92521, USA Received Aug. 25, 1998; accepted Jul. 19, 1999 (http://ac.els-cdn.com/.*

(Continued)

*Primary Examiner* — Jean-Paul Cass
(74) *Attorney, Agent, or Firm* — John A. Kramer; Global Patent Operation

(57) ABSTRACT

A control system includes a controller and an energy management system. The controller is onboard a vehicle that includes motors and an onboard energy storage device that powers the motors. The energy management system calculates estimated electric loads of powering the motors over one or more segments of a trip according to designated operational settings of a trip plan. The energy management system also determines a demanded amount of electric energy for powering the vehicle based on the estimated electric loads. The demanded amount of electric energy is based on a stored amount of electric energy in the onboard storage device. The energy management system communicates the demanded amount of electric energy to one or more of plural wayside stations disposed along the route so that (Continued)

the wayside stations have sufficient electric energy to charge the onboard energy storage device with the electric energy to meet the estimated electric loads.

12 Claims, 9 Drawing Sheets

(51) Int. Cl.
  *B60K 6/46* (2007.10)
  *B60W 20/00* (2016.01)

(52) U.S. Cl.
  CPC ....... *B60L 11/1842* (2013.01); *B60L 11/1844* (2013.01); *B60L 11/1846* (2013.01); *B60L 11/1848* (2013.01); *B60W 50/0097* (2013.01); *B60L 2200/26* (2013.01); *B60L 2230/20* (2013.01); *B60L 2230/40* (2013.01); *B60L 2240/62* (2013.01); *B60L 2240/64* (2013.01); *B60L 2240/66* (2013.01); *B60L 2240/68* (2013.01); *B60L 2240/72* (2013.01); *B60L 2240/80* (2013.01); *B60L 2260/52* (2013.01); *B60L 2260/54* (2013.01); *B60W 20/00* (2013.01); *B60W 2550/40* (2013.01); *B60W 2550/402* (2013.01); *Y02E 60/721* (2013.01); *Y02T 10/6217* (2013.01); *Y02T 10/648* (2013.01); *Y02T 10/705* (2013.01); *Y02T 10/7005* (2013.01); *Y02T 10/7044* (2013.01); *Y02T 10/7088* (2013.01); *Y02T 10/7291* (2013.01); *Y02T 10/84* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | | | |
|---|---|---|---|---|
| 8,324,858 | B2* | 12/2012 | Hill | B60L 5/42 104/34 |
| 8,457,821 | B2* | 6/2013 | Shaffer | B60L 11/184 180/272 |
| 8,543,272 | B2* | 9/2013 | Yu | B60W 50/0097 180/65.265 |
| 2004/0074682 | A1* | 4/2004 | Fussey | B60K 6/12 180/65.21 |
| 2007/0282495 | A1* | 12/2007 | Kempton | B60L 8/00 701/22 |
| 2009/0114463 | A1* | 5/2009 | DeVault | B60K 6/365 180/65.29 |
| 2009/0156268 | A1* | 6/2009 | Kim | H02J 7/025 455/573 |
| 2009/0200988 | A1* | 8/2009 | Bridges | G06Q 50/06 320/137 |
| 2009/0293759 | A1 | 12/2009 | Schmitz | |
| 2010/0094496 | A1* | 4/2010 | Hershkovitz | B60L 3/12 701/22 |
| 2010/0175579 | A1 | 7/2010 | Read | |
| 2010/0188043 | A1* | 7/2010 | Kelty | B60L 3/0046 320/109 |
| 2010/0207772 | A1* | 8/2010 | Yamamoto | B60L 11/1816 340/636.2 |
| 2010/0256830 | A1* | 10/2010 | Kressner | B60L 11/14 700/291 |
| 2010/0299007 | A1 | 11/2010 | Ghaly | |
| 2011/0184903 | A1* | 7/2011 | Sung | B60L 11/1822 706/50 |
| 2013/0137463 | A1* | 5/2013 | Busch | H04W 4/02 455/456.3 |

OTHER PUBLICATIONS

PCT Search Report and Written Opinion issued in connection with corresponding Application No. PCT/US2012/042086 on Feb. 5, 2013.

* cited by examiner

SYSTEM AND METHOD FOR CONTROLLING AND POWERING A VEHICLE

CROSS-REFERENCE TO RELATED APPLICATIONS

This application claims priority to U.S. Provisional Application No. 61/496,556, which was filed on 13 Jun. 2011 (the "'556 application"). The entire disclosure of the '556 application is incorporated by reference.

TECHNICAL FIELD

Embodiments of the subject matter disclosed herein relate to vehicles that at least partially use electric energy for vehicle propulsion. Other embodiments relate to providing power to and/or controlling such vehicles.

BACKGROUND

In certain electric vehicles (e.g., certain hybrid electric vehicles), the sole sources of electricity are from a fuel engine (e.g., fuel-powered generator) and regenerative braking (e.g., running a traction motor in a mode of operation as a generator, for slowing a vehicle, and thereby generating electricity that can be stored in an energy storage device). The costs of running such vehicles are dependent, typically, on local fuel costs. In other transportation systems, electric vehicles receive some or all of their electrical power from wayside (off-board) sources. The costs of running vehicles in such a system may be reduced, but this is dependent on the costs of electricity from the wayside source (typically tied to the local power grid). Thus, during some time periods (e.g., peak demand periods), costs may actually be higher. Additionally, the infrastructure for providing wayside electricity may be expensive, due to having to provide sufficient capacity for peak demands. One known solution to increase the capacity of energy supply is to add more wayside sources. But, adding such wayside sources can be time-consuming and costly.

BRIEF DESCRIPTION

In one embodiment, a control system (e.g., for controlling operations of a vehicle) includes a controller and an energy management system. The controller is configured to be disposed onboard a vehicle that includes one or more motors that propel the vehicle along a route during a trip and an onboard energy storage device for storing at least some of the electric energy used to power the one or more motors. The controller also is configured to control operations of the one or more motors according to a trip plan that designates operational settings of the one or more motors during the trip. The energy management system also is configured to calculate estimated electric loads of powering the one or more motors over one or more segments of the trip according to the designated operational settings of the trip plan and determine a demanded amount of electric energy for powering the vehicle based on one or more of the estimated electric loads. The demanded amount of electric energy is based on a stored amount of electric energy in the onboard energy storage device. The energy management system is further configured to communicate the demanded amount of electric energy to one or more of plural wayside stations disposed along the route so that the wayside stations have sufficient electric energy to charge the onboard energy storage device with the electric energy to meet the one or more of the estimated electric loads.

In another embodiment, a control system (e.g., for controlling charging of a vehicle) includes a controller and a charge storage system. The controller is configured to be disposed at a wayside station having an off-board energy storage device that charges an onboard power storage device of a vehicle traveling along a route during a trip. The controller also is configured to communicate with the vehicle as the vehicle travels along the route in order to determine a demanded amount of electric energy from the vehicle. The charge storage system is configured to be communicatively coupled with the controller and the off-board energy storage device at the wayside station. The charge storage system also is configured to at least one of generate or modify an energy storage plan that designates how much of the electric energy is to be stored in the off-board energy storage device during different time periods based on the demanded amount of electric energy that is received from the vehicle.

In another embodiment, a method (e.g., for controlling operations of a vehicle) includes calculating estimated electric loads of powering one or more motors of a vehicle with electric energy stored in an onboard energy storage device over one or more segments of a trip according to designated operational settings of a trip plan. The method also includes determining a demanded amount of the electric energy for powering the vehicle based on one or more of the estimated electric loads. The demanded amount of electric energy is based on a stored amount of electric energy in the onboard energy storage device. The method further includes communicating the demanded amount of electric energy to one or more of plural wayside stations disposed along the route so that at least a selected station of the wayside stations has sufficient electric energy to charge the onboard energy storage device with the electric energy to meet the one or more of the estimated electric loads when the vehicle arrives at the selected station.

In another embodiment, a system for powering vehicles includes a first wayside station and a second wayside station. The first wayside station is configured to provide electrical power to an electric vehicle. The second wayside station is configured to provide electrical power to the electric vehicle and is spaced apart from the first wayside station. One or both of the first and second wayside stations respectively comprise one or more of the following: an energy storage device for storing electrical energy, a first power transfer system, or a second power transfer system. The storage device has a maximum capacity of no more than a mean power demand of the wayside station, or no more than the mean power demand plus ten percent. The first power transfer system is configured to control transfer of electrical power between the first and second wayside stations. The second power transfer system is configured to control transfer of electrical power from one or more external sources to one or more of the first and second wayside stations. The first power transfer system and/or the second power transfer system are configured to control the transfer of electrical power based on one or more of: one of the wayside stations having a present demand or expected demand that exceeds a present capacity or an expected capacity of the wayside station; or a cost determination of one or more costs associated with electrical power provided from the energy storage device, electrical power provided between the wayside stations, or electrical power provided from the one or more external sources.

In another embodiment, a system for controlling an electric vehicle includes a control module configured to be operably coupled with the electric vehicle and to generate signals for controlling at least one of tractive effort of the electric vehicle or a source of electrical power for the vehicle based on one or more of: (a) one or more onboard parameters comprising: a schedule of the vehicle; a location of the vehicle with respect to wayside stations along a route of the vehicle, the wayside stations configured to provide electrical power to the vehicle; a maximum capacity and/or a present capacity of an energy storage device on board the vehicle; one or more costs associated with powering the vehicle using energy from a first onboard source comprising an energy storage device; or one or more parameters relating to powering the vehicle using energy from one or more second onboard sources different from the energy storage device; or (b) one or more off-board parameters comprising: cost information associated with powering the vehicle using energy from the wayside stations; locations of the wayside stations; or a present and/or an expected capacity of the wayside stations for providing electrical power to the vehicle.

In another embodiment, another control system includes a controller and a charge management system. The controller is configured to be disposed at a wayside station having an off-board energy source that charges an onboard energy storage device of a vehicle traveling along a route during a trip. The controller also is configured to communicate with the vehicle as the vehicle travels along the route in order to determine a demanded amount of electric energy from the vehicle. The charge management system is configured to be communicatively coupled with the controller and the off-board energy source of the wayside station. The charge management system also is configured to at least one of generate or modify an energy allocation plan that designates how much of the electric energy is to be allocated in association with the off-board energy source, for use in charging the onboard energy storage device of the vehicle, at one or more different time periods.

BRIEF DESCRIPTION OF THE DRAWINGS

Reference is now made briefly to the accompanying drawings, in which.

DETAILED DESCRIPTION

Figure 1:
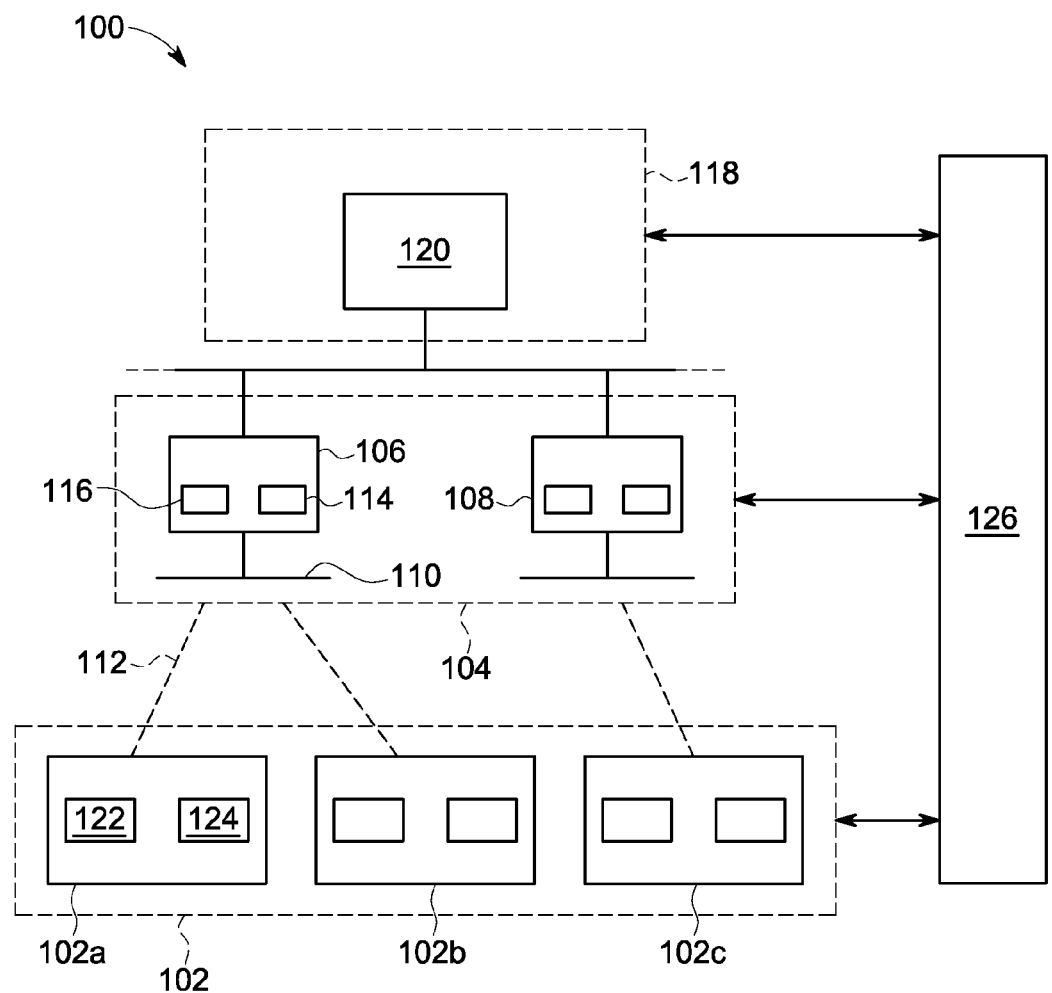
FIG. 1 shows a schematic diagram of an embodiment of a system for powering and controlling electric vehicles.

One or more embodiments of the inventive subject matter described herein relate to systems for powering and controlling electric vehicles. According to one aspect, a wayside electrical power distribution system ("wayside" referring to being accessible by electric vehicles, such as positioned along a vehicle route) includes plural spaced-apart wayside stations, each configured to provide electrical power to electric vehicles. The wayside stations include vehicle interface equipment for interfacing with vehicle systems, to convey power to vehicles operably linked with the interface equipment, and one or more power transfer systems for sourcing electrical energy for supplying to vehicles. The sources of electrical power (to which the power transfer system(s) are at least occasionally linked) may include one or more of: electrical power received from vehicles (e.g., electric current used by a first locomotive being received from a second locomotive in the same vehicle consist or a different vehicle consist); electrical power received from other wayside stations; electrical power received from an energy storage device of the wayside station; and electrical power received from non-vehicle external sources, such as remote energy storage devices, utility grids, local renewable power sources or other local power generation sources, and wide area renewable power sources or other wide area power generation sources.

The electric vehicles may be electric rail vehicles (e.g., locomotives, other freight or passenger rail vehicles, or rail-based ore carts or other mining equipment), other electric off-highway vehicles (e.g., electric mine haul trucks or heavy construction equipment), electric marine vessels, or other electric vehicles generally. As used herein, "electric vehicle" refers to a vehicle that uses electrical power for propulsion purposes, at least in one mode of operation. Thus, electric vehicles include all-electric vehicles (e.g., a vehicle with a traction motor and only an onboard electrical energy storage device or mechanism for receiving electric energy from an off-board source, such as an overhead catenary or powered rail), hybrid-electric vehicles (e.g., a vehicle with a traction motor, an energy storage device, hydraulic propulsion, and a fuel engine, fuel cell, or the like for charging the energy storage device and/or directly generating power for running the traction motor), dual-mode vehicles (e.g., a vehicle with an engine-only mode of operation and an electricity-only mode of operation, or a vehicle with a first mode of operation where traction electricity is provided by an engine and a second mode of operation where traction electricity is provided by another source), diesel-electric and other engine-electric vehicles (e.g., a vehicle with an engine that generates electrical power for running a traction motor), and combinations and variants thereof. Electric vehicles may have one traction motor, or plural traction motors;

"traction motor" refers to a motor of sufficient size and capacity to move a vehicle of sufficient size for at least carrying humans.

The electric vehicles are each provided with a respective control module, which may be a separate controller or other control system, or part of a multi-purpose vehicle controller or other control system. The control module is configured to generate signals for controlling tractive effort (braking and/or propulsion) of the electric vehicle and/or a source of electrical power for the vehicle. (Controlling a source of electrical power may include selecting among plural available sources, both in regard to the present time or scheduling across a future time period.) For a given electric vehicle, the sources of electrical power may include one or more of: a first onboard energy source, specifically, an onboard energy storage device; one or more second onboard energy sources (e.g., regenerative or dynamic braking, engines, generators, APU's, fuel cells, or the like); and/or the wayside electrical power distribution system.

According to another aspect, the system(s) includes communication functionality, centralized and/or distributed, for the exchange of information between one or more of: the wayside stations; the electric vehicles; the non-vehicle external sources; and/or a centralized control location (e.g., part of the wayside electrical power distribution system). The information exchanged may include one or more of the following: a present demand of a wayside station ("present demand" referring to an amount of electrical power that the wayside station has been requested to transfer at the present time); an expected demand of a wayside station ("expected demand" referring to an amount of electrical power that the wayside station will be requested to transfer at a future time); a present capacity of a wayside station ("present capacity" referring to an amount of electrical power that the wayside station can transfer at the present time, such as from an energy storage device of the wayside station), including information about the availability of transferring electrical power between wayside stations at the present time; an expected capacity of a wayside station ("expected capacity" referring to an amount of electrical power that the wayside station can transfer at a future time, such as from an energy storage device of the wayside station), including information about the availability of transferring electrical power between wayside stations at a future time; availability of electrical power provided from the one or more external sources; vehicle information (e.g., schedule, movement information such as position and speed, onboard energy storage device present capacity (present charge level) or maximum capacity (maximum charge level), information about planned transfer of electrical power from/to the wayside electrical power distribution system, information relating to onboard energy sources other than an energy storage device, or the like); and cost information relating to costs associated with any or all of the foregoing.

In an electric vehicle, the control module generates signals for controlling tractive effort and/or a source of electrical power for the vehicle, based on one or more onboard parameters and/or one or more off-board parameters. (Information may be received from the communication functionality.) Alternatively, separate control modules generate these signals. For example, a first control module may control tractive effort while a separate, second control module controls which source of electrical power is used for the vehicle. The onboard parameters comprise (or relate to) the vehicle information noted above; examples include: a schedule of the vehicle; a location of the vehicle with respect to wayside stations along a route of the vehicle, the wayside stations configured to provide electrical power to the vehicle; a maximum capacity and/or a present capacity of an energy storage device on board the vehicle; one or more costs associated with powering the vehicle using energy from a first onboard source comprising an energy storage device; emissions (e.g., gas, audible noise, electromagnetic current, electromagnetic interference, mechanical vibrations, track load, and the like) generated by the vehicle; or one or more parameters relating to powering the vehicle using energy from one or more second onboard sources different from the energy storage device. The off-board parameters may include one or more other aspects of the information noted above; examples include: cost information associated with powering the vehicle using energy from the wayside stations; locations of the wayside stations; maintenance costs of the vehicle; or a present and/or an expected capacity of the wayside stations for providing electrical power to the vehicle.

In a more specific example, the control modules of an electric vehicle take into account (i) information of the wayside stations along its route (e.g., present and/or expected capacity and associated costs), (ii) vehicle information (e.g., capacity and costs of onboard sources), and (iii), in some embodiments, information of external sources at the wayside (e.g., capacity/availability and costs). Based on this information, the control modules generates signals in regards to controlling tractive effort of the vehicle and/or selecting a source of electrical power for the vehicle, for controlling when and to what extent the vehicle is powered using onboard sources (and which of such sources) or using the wayside electrical power distribution system, in a manner that minimizes or at least reduces overall energy costs, and/or in a manner that achieves another designated objective for the vehicle. Thus, if a first wayside station has "x" amount of stored or network energy and the base energy cost is "y," and a second wayside station has "2x" amount at a base energy cost of "2y," then the control module can control time to arrival at the wayside stations and energy use/cost, given its onboard capacity, to reduce overall cost or otherwise. For carrying out such an operation, one or more of the control modules may utilize energy management system technology such as described in U.S. patent application Ser. No. 11/385,354, filed Mar. 20, 2006 (U.S. Patent Application Publication No. 2007/0219680), which is incorporated by reference herein in its entirety.

Given the above, the wayside electrical power distribution system and onboard control modules do not have to accommodate peak demand/capabilities, but instead for providing an integral of the average power requirement. Power deficiencies can be remedied by selecting among available external sources, and/or by controlling transfer of power between wayside stations and/or from external wayside sources (e.g., buying power from a renewable source, or a general public utility grid).

More specifically, in an embodiment, a wayside station includes an energy storage device for storing electrical energy. The storage device has a maximum capacity of no more than a mean power demand of the wayside station (defined over a given time period such as daily, weekly, or monthly), or no more than the mean power demand plus ten percent (ten percent representing a buffer that does not add significantly to the cost of the wayside station). In such a configuration, the costs for implementing the wayside station are significantly reduced, due to not having to provide capacity for peak demand.

In another embodiment, a wayside station includes a first power transfer system configured to control transfer of electrical power between wayside stations, and/or a second power transfer system configured to control transfer of electrical power from one or more external sources to the wayside station. The first power transfer system and/or the second power transfer system are configured to control the transfer of electrical power based on one or more of: one of the wayside stations (in the wayside electrical power distribution system) having a present demand or expected demand that exceeds a present capacity or an expected capacity of the wayside station; or a cost determination of one or more costs associated with electrical power provided from an energy storage device of the wayside station, electrical power provided between the wayside stations, or electrical power provided from the one or more external sources. Thus, if an expected demand on a wayside station exceeds an expected capacity of the wayside station (e.g., capacity of an energy storage device of the wayside station), the wayside station can control transfer of electrical power from another wayside station, or from an external wayside source, depending on cost information. Similarly, if a wayside station has sufficient capacity, but the cost of transferring power from an external source for providing to a vehicle would cost less, then the wayside station may control transfer of power form the external source instead of providing power from its energy storage device, for example.

The vehicle interface equipment of the wayside stations may comprise: "plug in" modules, e.g., the vehicle plugs into a receptacle of the wayside station, for receiving electrical power from the station; a continuous power interface by which a vehicle can receive off-board power while moving, such as a catenary line or third rail; or the like. In one embodiment, two wayside stations comprise first and second power substations, with the vehicle interface equipment of the two comprising two adjacent blocks of catenary or third rail separated by a neutral break.

Aspects of the inventive subject matter also relate to the possibility of an electric vehicle transferring power to the wayside electrical power distribution system. Thus, examples of providing electrical power from the wayside electrical power distribution system to an electric may include, in effect, a negative providing, that is, the vehicle provides power to the distribution system.

FIG. 1 shows a schematic diagram of an embodiment of a system 100 for powering and controlling electric vehicles 102 (102a, 102b, 102c). According to one aspect, a wayside electrical power distribution system 104 includes plural spaced-apart wayside stations 106, 108, each configured to provide electrical power to the electric vehicles 102. The wayside stations include vehicle interface equipment 110 for interfacing with vehicle systems, to convey power 112 to vehicles operably linked with the interface equipment, and one or more power transfer systems 114 for sourcing electrical energy for supplying to vehicles. The sources of electrical power may include one or more of: electrical power received from vehicles; electrical power received from other wayside stations; electrical power received from an energy storage device 116 of the wayside station; and electrical power received from non-vehicle external sources 118, such as remote energy storage devices, utility grids, local renewable power sources or other local power generation sources, and wide area renewable power sources or other wide area power generation sources (collectively, electric energy sources 120).

The electric vehicles 102 are each provided with a respective control module 122, which may be a separate controller or other control system, or part of a multi-purpose vehicle controller or other control system. The control module is configured to generate signals for controlling tractive effort (braking and/or propulsion) of the electric vehicle and/or a source of electrical power for the vehicle. The control module 122 is shown as a single module, but alternatively may represent multiple modules. For example, a first tractive control module 122 may generate signals for controlling tractive effort of the vehicle while a second energy control module 122 may generate signals for controlling a source of electrical power for the vehicle. The sources of electrical power may include one or more of: a first onboard energy source, specifically, an onboard energy storage device 124 (e.g., a fuel cell or battery); one or more second onboard energy sources (e.g., regenerative or dynamic braking, engines, generators, APU's, fuel cells, or the like); and/or the wayside electrical power distribution system. Communication functionality between the vehicles 102, the power distribution system 104, and/or the electric energy sources 120 is shown generally at 126. For example, communication functionality 126 may represent the transceivers and/or other associated circuitry, communication links (e.g., wired and/or wireless), and the like, used by the various vehicles 102, power distribution system 104, and/or electric energy sources 120 to communicate with each other.

Figure 2:
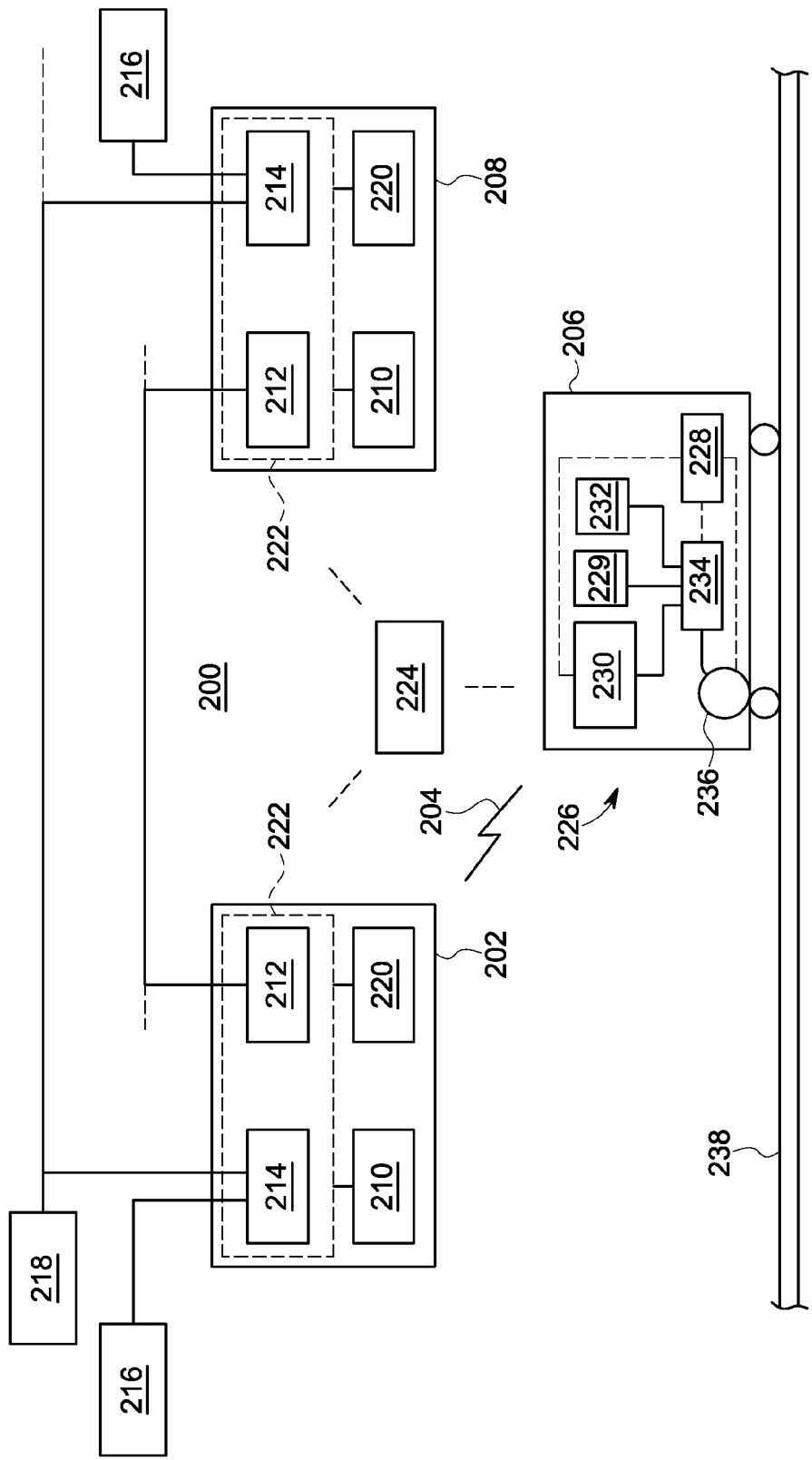
FIG. 2 shows a schematic view of a system for powering vehicles.

FIG. 2 shows a schematic view of a system 200 for powering vehicles. The system includes a first wayside station 202 configured to provide electrical power 204 to an electric vehicle 206. The system 200 additionally includes a second wayside station 208 configured to provide electrical power to the electric vehicle 206 and spaced apart from the first wayside station 202. For example, the wayside stations 202, 208 may not be physically coupled or connected with each other, and/or may be separated from each other by several meters, kilometers, or more. One or both of the first and second wayside stations 202, 208 respectively comprise one or more of the following: an off-board energy storage device 210 for storing electrical energy (in one embodiment, the energy storage device has a storage capacity of no more than a mean power demand of the wayside station 202, 208, or no more than the mean power demand plus ten percent or some other buffer amount); a first power transfer system 212 configured to control transfer of electrical power between the first and second wayside stations; and/or a second power transfer system 214 configured to control transfer of electrical power from one or more external sources 216, 218 to one or more of the first and second wayside stations 202, 208. The external sources may include a local external source 216 (e.g., available only to the wayside station in question, such as a battery or renewable energy source located at the wayside station in question), and/or a wide area external source 218 (e.g., a utility power grid, a battery conductively coupled with both wayside stations 202, 208, another power source connected with both wayside stations 202, 208, and the like). The wayside stations 202, 208 also include vehicle interface equipment 220 for interfacing with vehicle systems, to convey power to vehicles 206 operably linked with the interface equipment 220, and control/communication functionality, shown generally at 222. The first power transfer system and/or the second power transfer system are configured to control the transfer of electrical power based on one or more of: one of the wayside stations having a present demand or expected demand that exceeds a present capacity or an expected capacity of the wayside station; or a cost determination of one or more costs associated with electrical power provided from the energy storage device, electrical power provided between the wayside stations, or electrical power provided from the one or more external sources.

The system may further comprise a communication system 224 configured to at least one of: communicate between the wayside stations for exchange of information relating to the present demand, the expected demand, the present capacity, the expected capacity, or the cost determination; communicate between one or more of the wayside stations and one or more electric vehicles, for exchange of information relating to the cost determination, to expected or present power demands of the vehicles, and/or to movement of the vehicles; communicate between one or more of the wayside stations and the one or more external sources, for exchange of information relating to the present demand, the expected demand, the present capacity, the expected capacity, the cost determination, or electrical power available from the one or more sources; or communicate between one or more of the wayside stations and a central location, for exchange of information relating to any of the foregoing.

FIG. 2 also shows a system 226 for controlling an electric vehicle 206. The system 226 comprises a control module 228 configured to be operably coupled with the electric vehicle. The control module is further configured to generate signals for controlling at least one of tractive effort of the electric vehicle or a source of electrical power for the vehicle, based on one or more of one or more onboard parameters or off-board parameters. Alternatively, the control module 228 may represent plural separate control modules, such as a first control module 228 that generates signals for controlling tractive effort of the vehicle and a second control module that generates signals for controlling a source of electrical power for the vehicle. The one or more onboard parameters comprise: a schedule of the vehicle; a location of the vehicle with respect to wayside stations along a route of the vehicle; a maximum capacity and/or a present capacity of an energy storage device on board the vehicle; one or more costs associated with powering the vehicle using energy from a first onboard source comprising an energy storage device; or one or more parameters relating to powering the vehicle using energy from one or more second onboard sources different from the energy storage device. The one or more off-board parameters comprise: cost information associated with powering the vehicle using energy from the wayside stations; locations of the wayside stations; or a present and/or an expected capacity of the wayside stations for providing electrical power to the vehicle.

Also shown in FIG. 2, for illustration purposes, are the following components of an electric vehicle, according to an embodiment: an energy storage device 229; an onboard energy source 230 (other than the energy storage device); an external interface device 232 for receiving or transmitting electrical power from off-board; power control circuitry 234 for one or more of charging the energy storage device, powering other onboard systems, or powering a traction motor 236; and a route 238.

Figure 3:
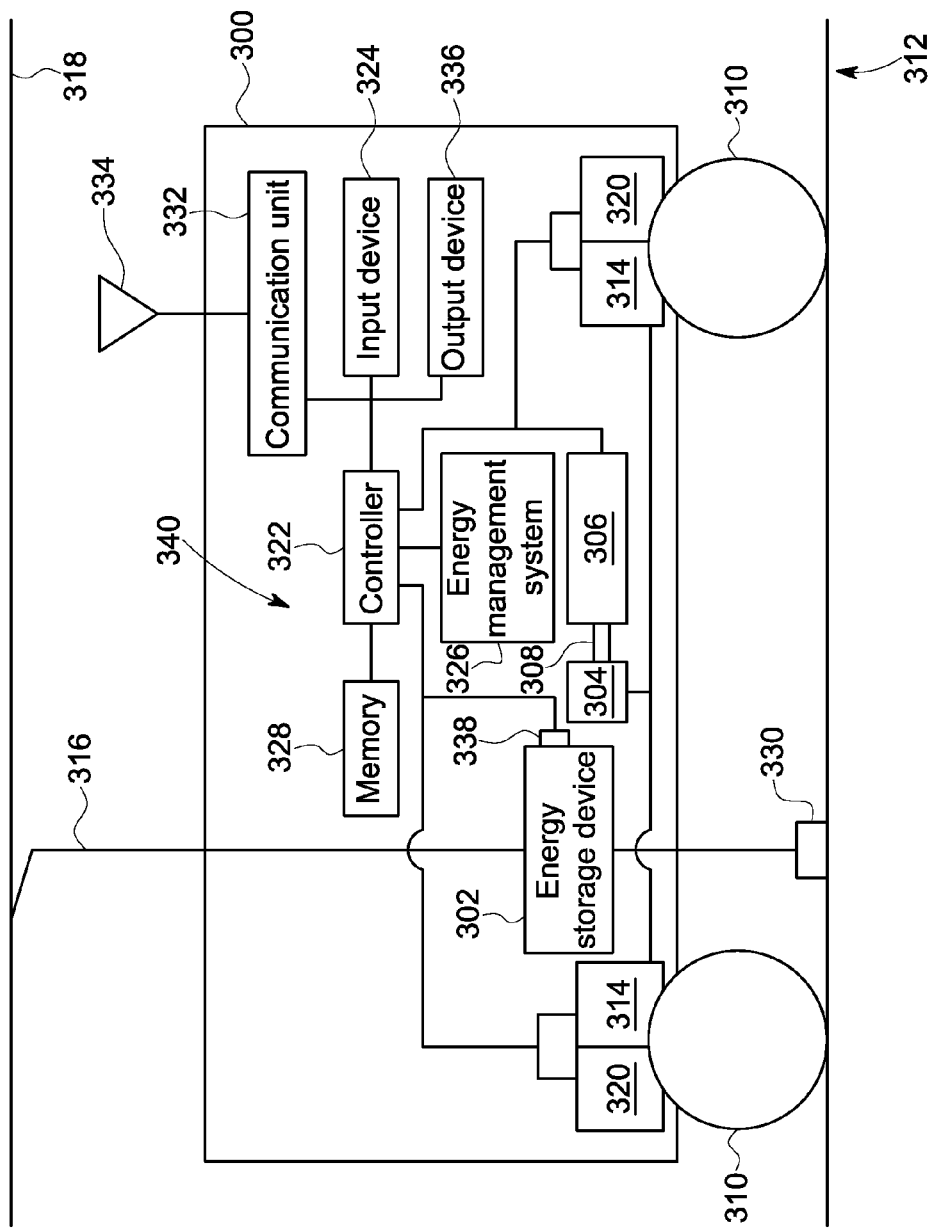
FIG. 3 is a schematic diagram of one embodiment of an electric vehicle having a control system for controlling the vehicle.

FIG. 3 is a schematic diagram of one embodiment of an electric vehicle 300 having a control system 340 for controlling the vehicle 300. The vehicle 300 may represent one of the vehicles 102, 206 (shown in FIGS. 1 and 2) according to one embodiment. As described above, the vehicle 300 includes tractive components (e.g., traction motors 314 that may represent the traction motors 236 shown in FIG. 2) that rotate wheels 310 (and/or axles joined to the wheels 310) of the vehicle 300 to generate tractive efforts that propel the vehicle 300 along a route 312 (which may represent the route 238 shown in FIG. 2). The traction motors 314 may be electrically powered by electric energy (e.g., electric current) supplied by one or more onboard and/or off-board sources. With respect to the onboard sources, the vehicle 300 can include an onboard energy storage device 302 (which can represent the onboard energy storage devices 124 and/or 228 shown in FIGS. 1 and 2), such as one or more fuel cells, batteries, and the like. The onboard sources also or alternatively can include one or more onboard energy sources (e.g., the source 230 shown in FIG. 2) that generates electric current onboard the vehicle 300. The onboard energy source can include a generator (or alternator) 304 that is connected to an engine 306 by a shaft 308. Rotation of the shaft 308 by the engine 306 rotates a rotor of the generator 304 to create electric energy (e.g., electric current). Alternatively or additionally, the onboard energy sources can include another type of device that generates or stores electric energy onboard the vehicle 300, such as one or more solar cells, wind turbines, and the like. In another example, the onboard energy sources can include the traction motors 314 when the traction motors 314 operate in a dynamic braking mode where electric energy is generated by the traction motors 314 during slowing of the vehicle 300.

While the onboard energy storage device 302 is shown as being disposed onboard the vehicle 300 and coupled with the propulsion system (e.g., the traction motors 314) of the vehicle 300, alternatively, the onboard energy storage device 302 may be disposed onboard another vehicle that is coupled with the vehicle 300. For example, the energy storage device 302 may be located on an energy tender vehicle that is connected with the vehicle 300 by one or more mechanical connections such that movement of the vehicle 300 also moves the tender vehicle. Such an energy storage device 302 can be connected with the propulsion system of the vehicle 300 by one or more conductive bodies (e.g., buses, cables, wires, and the like).

The energy storage device 302 can directly supply electric current to the traction motors 314 to power the motors 314 by being directly coupled with the traction motors 314 (e.g., with no intermediate conductive buses, transformer, and the like, disposed between the energy storage device 302 and the motors 314). Alternatively or additionally, the energy storage device 302 can indirectly supply the electric current to the traction motors 314 by conveying the current to the motors 314 through one or more conductive buses, transformers, and the like.

The energy storage device 302 can include a monolithic or hierarchical storage system, where individual battery blocks or cells are connected in series or parallel arrangements that may include sub-inverters and/or controllers for multiple blocks that then are supervised by a higher level system, that also may have an additional inverter to match the storage system power transfer requirements to that of the loads of the vehicle 300, such as the traction motors 314 and/or other loads (e.g., auxiliary loads as described herein).

The off-board energy sources (e.g., the energy storage devices 116, 210 and/or the non-vehicle external energy sources 118, 216, 218 of the wayside stations 106, 108, 202, 208 shown in FIGS. 1 and 2) can be connected with the vehicle 300 by one or more conductive pathways that extend alongside the route 312 being traveled by the vehicle 300. For example, an overhead catenary 318 may represent the interface equipment 110, 220 (shown in FIGS. 1 and 2) of the wayside stations 106, 108, 202, 208 (shown in FIGS. 1 and 2) that supplies electric energy to an interface device 232 (shown in FIG. 2), such as a pantograph 316 of the vehicle 300. As another example, a powered portion of the route 312, such as an electrified rail, can represent the interface equipment 110, 220 of the wayside stations 106, 108, 202, 208 that provides electric energy to a shoe 330 or other interface device. The electric energy that is received through the interface devices of the vehicle 300 can be used to charge the onboard energy storage device 302 and/or power the traction motors 314.

In addition to providing propulsive force to propel the vehicle 300, the traction motors 314 also can act to slow or stop movement of the vehicle 300 using dynamic braking. At least some of the electric energy generated by the dynamic braking can be provided to the energy storage device 302 for storage. Additionally or alternatively, the energy generated by dynamic braking may be used for other regenerated uses, battery use, to power other auxiliary systems and head end power, such as coach lighting and air conditioning, and the like. The vehicle 300 may include additional brakes, such as air brakes 320, that can slow or stop movement of the vehicle 300.

The system 340 includes a controller 322 disposed onboard the vehicle 300. The controller 322 can represent the control module 122, 228 (shown in FIGS. 1 and 2). The controller 322 can include one or more processors, microcontrollers, or other logic-based devices, and/or associated software or instructions, for carrying out one or more operations described herein. The controller 322 controls operations of the vehicle 300, such as by controlling the tractive efforts and/or braking efforts provided by the traction motors 314. The controller 322 may be manually operated by receiving instruction signals from an input device 324 (e.g., a device that receives input from an operator, such as a touchscreen, joystick, keyboard, switch, wheel, microphone, and the like) based on manual input from an operator at the input device 324. An output device 336 (e.g., a display, monitor, touchscreen, speaker, light, and the like) can provide information to the operator, such as current operational settings of the vehicle 300, designated operational settings of a trip plan (as described below), a current amount of electric energy stored onboard the vehicle 300, a current storage capacity of the onboard energy storage device 302, and the like. In one embodiment, the controller 322 includes or represents the power control circuitry 234 shown in FIG. 2.

Alternatively or additionally, the controller 322 may be automatically operated to autonomously control operations of the vehicle 300. For example, a trip plan may be provided by an energy management system 326 and/or stored on a tangible and non-transitory computer readable storage medium, or memory 328, that is accessible by the controller 322. The controller 322 and energy management system 326 may represent the two or more control modules described above in connection with FIGS. 1 and 2 in one embodiment. The trip plan may designate operational settings of the vehicle 300 as a function of time or distance along the route 312 for a trip of the vehicle 300 to a destination location. The designated operational settings of the trip plan may be established in order to reduce one or more of fuel consumed, emissions generated, or time spent in transit by the vehicle 300 for the trip, as described in connection with U.S. Patent Application Publication No. 2007/0219680. The energy management system 326 can include one or more processors, microcontrollers, or other logic-based devices, and/or associated software or instructions, for carrying out one or more operations described herein. The energy management system 326 can generate the trip plan and/or modify the trip plan based on changing conditions during travel of the vehicle 300 along the route 312, as described below and in U.S. Patent Application Publication No. 2007/0219680.

In one embodiment, the energy management system 326 generates the trip plan to designate operational settings of the vehicle 300 (e.g., throttle and/or brake settings) so that travel of the vehicle 300 according to the trip plan consumes less electric energy relative to traveling along the same trip according to a different plan and/or different operational settings. For example, in a manner similar to the reduction of fuel consumed by generating and following a trip plan according to U.S. Patent Application Publication No. 2007/0219680, a trip plan can be generated to reduce the consumption of electric energy and/or to prolong a distance traveled by the vehicle 300 while consuming the electric energy provided by the energy storage device 302 relative to traveling according to another plan and/or other operational settings. The controller 322 can receive the trip plan from the energy management system 326 and generate control signals based on the trip plan. The control signals may be communicated to the traction motors 314 and/or brakes 320 to implement the designated operational settings of the trip plan.

The energy management system 326 is shown as being disposed onboard the vehicle 300, but alternatively may be disposed off-board the vehicle 300, such as at a remote location (e.g., a dispatch center). The vehicle 300 can communicate with such an off-board energy management system 326 using a communication unit 332 (e.g., transceiver circuitry and hardware, such as a wireless antenna 334) of the vehicle 300.

In operation, the energy management system 326 can monitor operational conditions of the vehicle 300 and generate or modify a trip plan based on the operational conditions. The operational conditions can include load parameters that impact how much electric energy that is consumed (or is calculated to be consumed) in order to propel the vehicle 300 along the route 312 to a designated location. For example, changes in the load parameters can change an estimated trip load that represents the amount of electric energy that is calculated or anticipated to be needed (e.g., drawn) from the onboard power storage device 302 to power the traction motors 314 to propel the vehicle 300 over at least the portion of a trip.

A variety of load parameters may be monitored by the energy management system 326 to determine an estimated trip load. By way of example, these factors can include the speed at which the vehicle 300 is traveling (e.g., with the estimated trip load increasing for faster speeds or decreasing for slower speeds), the weight of the vehicle 300 (e.g., with the estimated trip load increasing for increasing weight or decreasing with decreasing weight), the grade of one or more segments of the route 312 (e.g., with the estimated trip load increasing for uphill grades or decreasing for downhill grades), efficiencies of the traction motors 314 (e.g., with the estimated trip load increasing for traction motors 314 that consume more energy to be powered or decreasing for traction motors 314 that consume less energy to be powered), and the like. Other load parameters may include the amount of electric energy that is consumed by other electric loads that do not work to propel the vehicle 300. For example, the load parameters can represent the amount of electric energy that is lost to equipment that does not propel the vehicle 300, such as lights, heat and/or cooling systems, navigational systems, and the like.

Other examples of load parameters may include an amount of vehicular traffic in a transportation network that includes the route 312 along which the vehicle 300 is or will be traveling (referred to herein as "transportation network congestion"). If the transportation network congestion is significant, then the vehicle 300 may need to travel at slower speeds and/or take longer to reach a wayside station where the vehicle 300 can recharge the onboard energy storage device 302. Conversely, if the transportation network congestion is relatively low, then the vehicle 300 may be able to travel at faster speeds and/or reach a wayside station where the vehicle 300 can recharge sooner. Traveling at faster speeds and/or operating on electric energy from the onboard energy storage device 302 for longer time periods can increase the estimated trip load of the vehicle 300 while traveling at slower speeds and/or operating for shorter time periods can reduce the estimated trip load.

The operational conditions can include charging restrictions that represent limitations on how much electric energy can be provided or is available to propel the vehicle 300 along the route 312. The charging restrictions represent limitations on acquiring the electric energy that is used to propel the vehicle 300 along the route 312 during the trip. These limitations can include onboard or off-board limitations on the availability and/or amount of electric energy that is available to the vehicle 300.

Onboard limitations can include a limitation on the amount of energy that can be stored by the onboard energy storage device 302 (e.g., the storage capacity of a battery), an amount of energy that is currently stored in the onboard energy storage device 302, the number of onboard energy storage devices 302, resistance losses of the vehicle 300 (e.g., the amount of electric energy that is lost due to resistance by the flow of electric current through the vehicle 300), and the like.

Off-board limitations can include locations of the off-board energy sources (e.g., the distances between wayside stations 106, 108, 202, 208 or powered sections of the route 312 where additional electric energy can be obtained for charging the onboard energy storage device 302 or powering the traction motors 314), the amount of energy that is available for charging the onboard energy storage device 302 at one or more of the off-board energy sources (e.g., an amount of energy that is currently available at a wayside station or powered section of the route 312 to charge the onboard energy storage device 302 and/or that will be available when the vehicle 300 arrives at the wayside station or powered section), a charging capacity at one or more of the off-board energy sources (e.g., an amount of electric energy that can be stored at a wayside station or that can be supplied from a powered section of the route), locations or segments of the route 312 where no off-board energy sources are available (e.g., sections of the route 312 that extend between the off-board energy sources), the financial cost of obtaining electric energy from the off-board energy sources (e.g., where different off-board energy sources charge different amounts to obtain electric energy from the off-board energy source), and the like. The financial cost of obtaining electric energy from the off-board energy sources may be referred to as a "charging cost." Another example of an off-board limitation is the rate at which the onboard storage device 302 can be charged by an off-board source. When the onboard storage device 302 is being charged and the vehicle 300 is stationary (e.g., at a wayside station), the storage device 302 may be charged at a rate that is slower than a rate at which the storage device 302 is charged when the vehicle 300 is moving and the storage device 302 is charged by an off-board source such as a catenary 318 or electrified rail. Similarly, the rate of charging the storage device 302 may increase for faster speeds of the vehicle 300.

The energy management system 326 generates a trip plan and/or modifies a trip plan (e.g., for a previously generated trip plan) based on the load parameters and the charging restrictions. The trip plan includes propulsion operational settings of the vehicle 300, such as throttle settings, brake settings, tractive effort or power output from the traction motors 314, braking effort from the traction motors 314 and/or other brakes 320, speeds of the vehicle 300, and the like. The propulsion operational settings are used to control movement of the vehicle 300 during the trip. For example, the propulsion operational settings may be expressed as a function of time expired during a trip and/or distance along the route 312 of the trip and the actual operational settings of the vehicle 300 can be controlled to match or follow the propulsion operational settings that are designated by the trip plan. In one embodiment, the controller 322 controls actual traction settings (e.g., settings of the traction motors 314) or actual brake settings (e.g., settings of the traction motors 314 during dynamic braking and/or settings of the brakes 320) by monitoring actual settings of the traction motors 314 and/or brakes 320 and then changing the actual settings to more closely match the designated propulsion operational settings of the trip plan.

In one embodiment, the energy management system 326 determines how much electric energy is available for a trip or for one or more segments or portions of the trip. The energy management system 326 may determine an available amount of electric energy as including one or more (or all) of a current amount of stored electric energy ($E_{C,S}$), a current amount of available onboard generated electric energy ($E_{C,G}$), a current amount of off-board available electric energy ($E_{C,O}$), an estimated amount of upcoming available onboard generated electric energy ($E_{U,G}$), and/or an estimated amount of upcoming available off-board electric energy ($E_{U,O}$).

The current amount of stored electric energy includes the electric energy that is currently stored in the onboard energy storage device 302 (which may change as the energy is consumed to power the vehicle 300 during the trip). The energy management system 326 may monitor the amount of electric energy that is stored onboard in the energy storage device 302 (e.g., by being communicatively coupled with the onboard energy storage device 302 and/or an energy sensor 338 coupled with the device 302 by one or more wired and/or wireless connections) as the vehicle 300 travels along the route 312 during the trip.

The current amount of available onboard generated electric energy includes the electric energy that may be currently available from onboard energy sources, such as by being generated by components disposed onboard the vehicle 300. For example, this energy may be the amount of electric energy that can be generated by the traction motors 314 during dynamic braking and/or by the generator 304 at a current time and/or while the vehicle 300 is traveling along a current segment of the trip.

The current amount of off-board available electric energy includes the electric energy that may be currently obtained from off-board energy sources, such as from a wayside station 106, 108, 202, 208, a catenary 318, a powered section of the route 312, and the like. As one example, the current amount of off-board available electric energy can be non-existent when the vehicle 300 is disposed remote from off-board energy sources. Conversely, the current amount of off-board available electric energy may be larger when the vehicle 300 is at a wayside station 106, 108, 202, 208 and/or is traveling along a powered section of the route 312 (e.g., with the available electric energy decreased by resistance losses in the catenary 318, powered rail, or the like).

The estimated amount of upcoming available onboard electric energy includes the electric energy that is calculated or estimated to be stored onboard the vehicle 300 in the energy storage device 302 at one or more times and/or locations along the trip. This amount of electric energy can be calculated by determining the estimated trip load to the time or location of interest and subtracting this estimated trip load from a starting amount of electric energy that is stored in the energy storage device 302 prior to traveling toward the time or location of interest. Alternatively or additionally, this amount of electric energy can be based on historical data. For example, during one or more previous trips by the vehicle 300 or a similarly configured vehicle 300 over the same or similarly configured trip or segment of the trip, the amount of electric energy that is actually consumed when the vehicle 300 is operated according to associated operational settings can be recorded. This previously monitored amount of consumed electric energy can be stored in the memory 328 or otherwise communicated to the energy management system 326 (e.g., from an off-hoard source). The energy management system 326 can refer to the previously monitored amounts of consumed electric energy for an associated (e.g., the same) segment of a trip and/or the entire trip. The previously monitored energy can be subtracted from a sum of available electric energy (e.g., one or more of the current amount of stored electric energy ($E_{C,S}$), the current amount of available onboard generated electric energy ($E_{C,G}$), the current amount of off-board available electric energy ($E_{C,O}$), and/or the estimated amount of upcoming available off-board electric energy ($E_{U,O}$)) to determine the estimated amount of electric energy that will be available for powering the vehicle 300.

The estimated amount of upcoming available off-board electric energy includes the electric energy that is calculated or estimated to be available off-board the vehicle 300 at one or more times and/or locations along the trip. This amount of electric energy can be calculated or estimated based on amounts of electric energy that are known or estimated to be available at one or more upcoming (e.g., along a direction of travel) off-board energy sources along the route 312 of the trip. For example, with respect to catenaries 318 and/or powered sections of the route 312, the amount of electric current supplied by these off-board energy sources may be designated (e.g., known) and stored in the memory 328 along with the associated locations of the sections of the route 312 having the catenaries 318 and/or powered sections. Alternatively, the electric energy that will be available from these sources may be communicated to the energy management system 326 from an off-board source (e.g., a dispatch center, utility company, wayside station, and the like) via the communication unit 332 of the vehicle 300.

With respect to wayside stations 106, 108, 202, 208, the amount of electric energy that is estimated to be available at the stations when the vehicle 300 arrives at the stations may be designated (e.g., predetermined) and stored in the memory 328 along with the associated locations of stations. Alternatively or additionally, this estimated amount of electric energy may be known by communication between the stations and the energy management system 326 (e.g., via the communication unit 332 of the vehicle 300). For example, the stations may communicate an amount of electric energy that is currently available or is estimated to be available at a time when the vehicle 300 arrives at the stations to the vehicle 300. The stations may communicate this information on a periodic basis and/or when prompted, such as when the vehicle 300 moves to within a predetermined range of the stations and/or transmits a request for the information.

In one embodiment, the estimated amount of electric energy that will be available at the wayside stations 106, 108, 202, 208 may be requested by the vehicle 300. For example, the energy management system 326 and/or an operator of the vehicle 300 may transmit a request signal via the communication unit 332 to an upcoming wayside station 106, 108, 202, 208. The request signal may designate an amount of electric energy that the energy management system 326 and/or operator of the vehicle 300 wants to obtain from the wayside station 106, 108, 202, 208 when the vehicle 300 arrives at the wayside station 106, 108, 202, 208.

The energy management system 326 can determine the amounts of electric energy that are available, will be available, and/or are estimated to be available at various locations and/or times along the trip. For example, the available electric energy can be determined for one or more segments of a trip to one or more designated locations. In one embodiment, the energy management system 326 also determines the estimated trip load for one or more of the same segments of the trip and/or for the entire trip. The energy management system 326 compares the available electric energy to the estimated trip load over one or more of the segments of the trip and/or over the entire trip in order to ensure that the vehicle 300 has sufficient electric energy to reach one or more designated locations.

Based on this comparison, the energy management system 326 may determine that an excess of electric energy is stored onboard, a shortage of electric energy exists, or sufficient electric energy is stored onboard. In one embodiment, the estimated trip load can include an energy buffer, such as an amount of reserve energy that is to be held in the onboard energy storage device 302 in the event that the estimated electric load involved in powering the vehicle 300 is smaller than the actual trip load (e.g., the amount of electric energy that is actually consumed to power the vehicle 300 to the designated location).

An excess of electric energy may be identified when the amount of electric energy stored in the onboard energy storage device 302 is greater than the estimated trip load. For example, the onboard energy storage device 302 may have more electric energy stored than what is needed to power the vehicle 300 to a designated location associated with the estimated trip load. A shortage may be identified when the amount of electric energy stored onboard the vehicle 300 is less than the estimated trip load. For example, the onboard energy storage device 302 may only have enough stored electric energy to power and propel the vehicle 300 over a portion of the trip that does not extend to a designated location (e.g., a location of an off-board source of energy such as a wayside station 106, 108, 202, 208 and/or powered section of the route 312). A sufficient amount of electric energy may be an amount of electric energy that is stored onboard the vehicle 300 (e.g., in the energy storage device 302) and that equal to or greater than the estimated trip load while being relatively close to the estimated trip load (e.g., within 3%, 5%, and the like).

Based on the comparison of the estimated trip load and the stored electric energy onboard the vehicle 300, the energy management system 326 may generate and/or change a trip plan. In one embodiment, the energy management system 326 first determines the available electric energy for the vehicle 300 over one or more segments of the trip and/or over the entire trip and then determines the operational settings of the trip plan so that the corresponding estimated trip load does not exceed the available electric energy. Alternatively, the energy management system 326 determines the estimated trip loads required to get the vehicle 300 to travel over one or more segments of the trip and/or over the entire trip and compares the estimated trip loads to corresponding amounts of available electric energy.

The energy management system 326 may create a trip plan based on one or more restrictions that limit or dictate the operational settings to be included in the trip plan. The restrictions may be assigned to the trips of the vehicles 300 based on a variety of different factors, such as the cargo or passengers being conveyed by the vehicle 300, a legal contract that the vehicle 300 is operating pursuant to (e.g., a shipping contract), the movement of other vehicles in a network of routes through which the trip will cause the vehicle 300 to travel, and the like. One example of a restriction may be a time of arrival at a final destination location and/or one or more intermediate locations. For example, the trip plan may be formed to ensure that the vehicle 300 arrives at a location no later than a designated arrival time and/or within a time window. Another example of a restriction may be a cost of the trip. For example, the trip plan may be formed to reduce the financial cost of fuel and/or electric energy that is used to power the vehicle 300 over the course of the trip (relative to another trip plan). Another example of a restriction is to ensure that crew members of the vehicle 300 do not work onboard the vehicle 300 for longer than a designated time period (e.g., the trip plan is formed to include stops so that the crews can be replaced). Another restriction may be a limitation on the amount of electric energy obtained from one or more sources. For example, a trip plan may be restricted such that no more than a designated amount of fuel is used (or at least a reduced amount of fuel is used relative to another plan) to generate electric energy for powering the vehicle 300. Other restrictions may be used.

Another example of a restriction may be a designated amount of electric energy that may need to be held in reserve in order to power one or more auxiliary systems of the vehicle 300, a head end power system of the vehicle 300, and/or additional loads that do not work to propel the vehicle 300 (e.g., "coach" loads that power devices or circuits in a passenger car coupled with the vehicle 300).

Another restriction may be partially operational systems of the vehicle 300 that change how much electric current is actually consumed by the systems versus when the systems are not partially operational. For example, cooling systems, ventilation systems, brakes, propulsion systems (e.g., traction motors 314), energy transfer systems (e.g., transformers), and the like, may be partially operational and not consume and/or transfer as much electric energy as when the systems are fully operational.

An additional example of a restriction may be an external restriction, such as a limitation on the amount of audible noise that can be generated by the vehicle 300, an operating temperature of the vehicle 300, and the like. For example, areas inside tunnels and passenger stations may limit how hot the engine of a vehicle 300 can operate and/or how loud the vehicle 300 can be. Such restrictions may be external in that the restrictions are controlled or enacted by third parties. Another external restriction may be a speed limit. For example, some areas of the route may require that the vehicle 300 maintain a speed that is at least as fast as a lower speed limit and/or that the vehicle 300 travel at a speed that is no greater than an upper speed limit. Another restriction may be a limit on inter-car forces in the vehicle 300. If the vehicle 300 represents several vehicle units (e.g., cars) coupled together and/or the vehicle 300 is coupled with one or more other vehicles, a restriction may be placed on the forces that can be exerted on the coupling mechanisms (e.g., the couplers) between the vehicles and/or units that are coupled with each other. Such restrictions may not allow for the forces on the couplers to exceed a designated amount.

The energy management system 326 determines the available electric energy (onboard and/or off-board) for the vehicle 300 over the course of the trip and formulates the operational settings of the vehicle 300 so that the vehicle 300 meets the restrictions applicable to the trip. The energy management system 326 can create the operational settings so that the vehicle 300 meets or satisfies the restrictions, while ensuring that the estimated trip load of the trip remains less than the electric energy that is available to the vehicle 300. These operational settings can include the settings of the propulsion system (e.g., the traction motors 314) that act to propel the vehicle 300 and/or the settings of auxiliary systems, such as lighting, air conditioning, and other systems, that are powered by electric current but do not work to propel the vehicle 300. The settings of the auxiliary systems can be designated in the trip plan so as to conserve sufficient electric energy to ensure that the vehicle 300 is able to reach one or more designated locations. For example, the lighting may be dimmed or turned off during daylight hours, the air conditioning may be reduced or turned off based on weather conditions, and the like, in order to reduce the amount of electric energy that is consumed by these auxiliary systems if the energy management system 326 determines that additional energy is needed to get the vehicle 300 to the next charging location or destination location.

Figure 4:
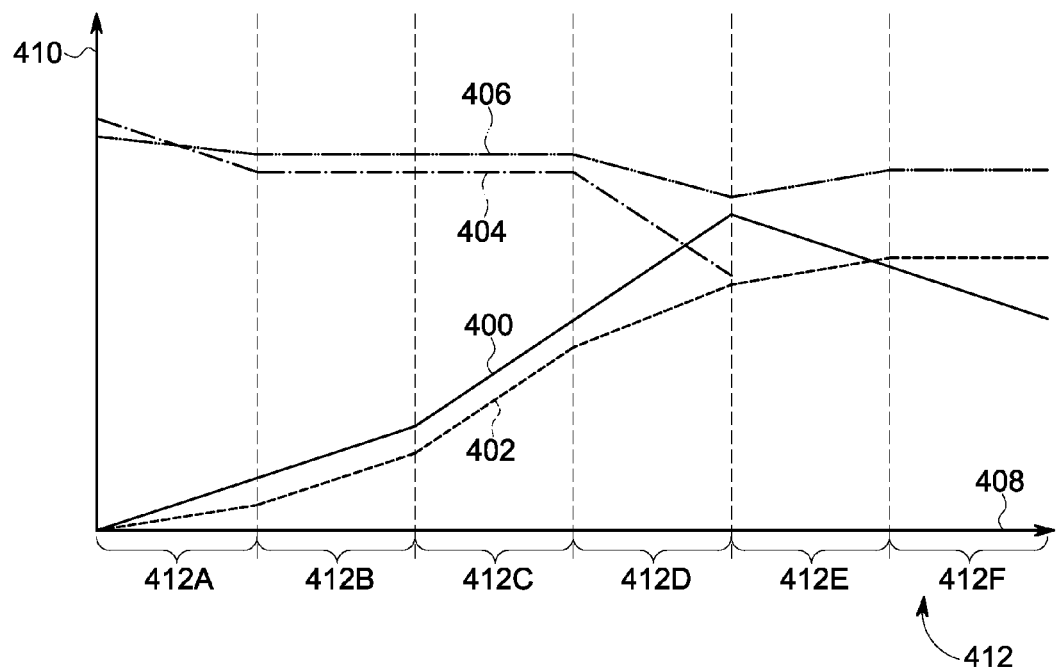
FIG. 4 illustrates an example of estimated trip loads for the vehicle shown in FIG. 3 during a trip according to different trip plans.
Figure 5:
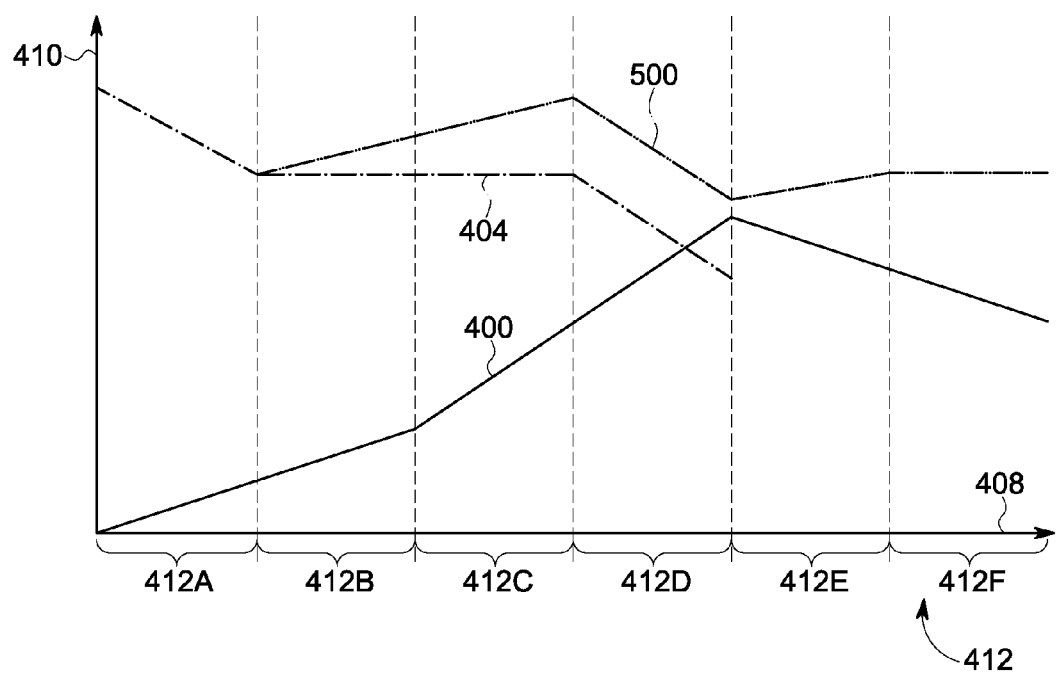
FIG. 5 illustrates another example of an estimated trip load shown in FIG. 4 for the vehicle shown in FIG. 3 according to different trip plans.
Figure 6:
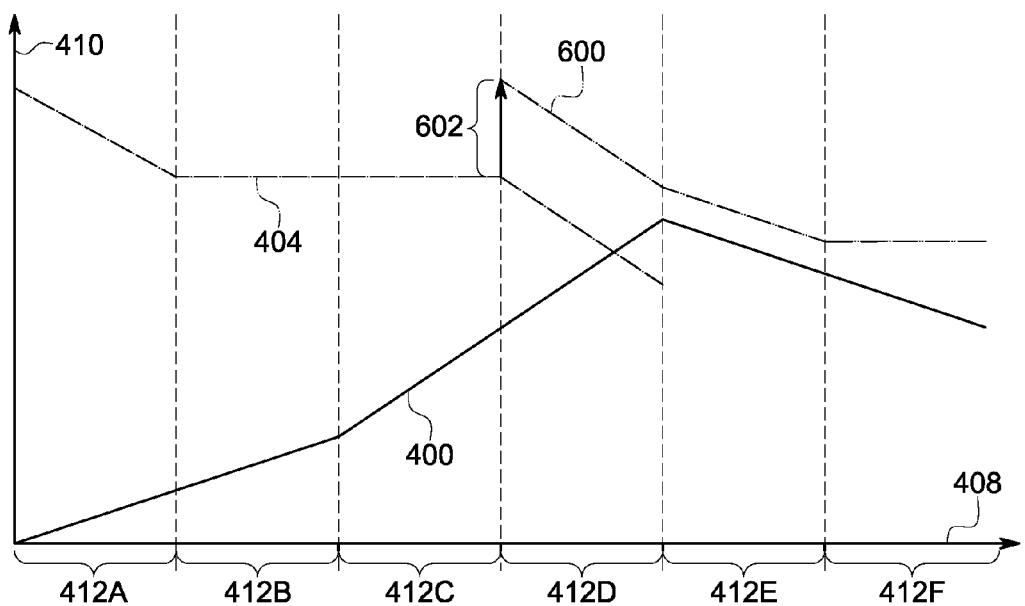
FIG. 6 illustrates another example of the estimated trip load shown in FIG. 4 for the vehicle shown in FIG. 3 according to different trip plans.

FIGS. 4 through 6 provide different examples of how the energy management system 326 can create or modify trip plans to that the vehicle 300 can be powered to travel over a trip. The energy management system 326 may modify the trip plan prior to the vehicle 300 commencing the trip and/or during movement of the vehicle 300 in the trip. For example, as the vehicle 300 travels, the energy management system 326 may determine that the vehicle 300 may not have sufficient onboard stored electric energy to meet the estimated trip load. In response, the energy management system 326 can modify the trip plan as described below.

FIG. 4 illustrates an example of estimated trip loads 400, 402 for a vehicle 300 (shown in FIG. 3) traveling along a route 312 (shown in FIG. 3) for a trip according to different trip plans. Also shown in FIG. 4 are electric energies 404, 406 that are stored onboard the vehicle 300 that travels along the route 312 for the trip according to the different trip plans. The estimated trip loads 400, 402 and onboard stored electric energies 404, 406 are shown alongside a horizontal axis 408 representative of progress along the trip and a vertical axis 410 representative of electric energy, such as electric energy represented in terms of joules, watts, and the like. The trip progress represented by the horizontal axis 408 can be expressed temporally or spatially, such as by time elapsed or distance traveled since the beginning of the trip or since a designated time or location in the trip. The trip progress is segmented in the illustrated example into six segments 412 (e.g., 412A-412F), although the trip may be segmented into fewer or more segments.

In the illustrated example, the first segment 412A represents a portion of the route 312 of the trip that extends over relatively flat terrain and does not have an available off-board source of electric energy (such as a catenary 318 shown in FIG. 3 or electrified rail). A subsequent, connected second segment 412B represents a portion of the route 312 that extends over relatively flat terrain but does include an off-board source of electric energy available for the vehicle 300 to use to power and propel the vehicle 300. A subsequent, connected third segment 412C represents a portion of the route 312 that extends over a positive grade (e.g. an uphill portion of the route 312) and that includes an off-board source of electric energy for the vehicle 300. A subsequent, connected fourth segment 412D represents a portion of the route 312 that extends over a positive grade but does not include an off-board source of electric energy. A subsequent, connected fifth segment 412E represents a portion of the route 312 that extends over a negative grade (e.g., a downhill portion of the route 312) and does not include an off-board source of electric energy. A subsequent, sixth segment 412F represents a portion of the route 312 that extends over a negative grade but does include an off-board source of electric energy. Table 1 below summarizes the segments 412 of the trip:

| Segment | Grade | Off-Board Source Of Electric Energy? |
|---------|-------|--------------------------------------|
| 412A | 0 (flat) | No |
| 412B | 0 (flat) | Yes |
| 412C | +(uphill) | Yes |
| 412D | +(uphill) | No |
| 412E | −(downhill) | No |
| 412F | −(downhill) | Yes |

The first estimated trip load 400 represents the trip load that is calculated for the various trip segments 412 based on a first trip plan calculated by the energy management system 326 (shown in FIG. 3). The first stored electric energies 404 represents the onboard electric energy that is stored onboard the vehicle 300 (e.g., in the onboard energy storage device 302 shown in FIG. 3) during the various trip segments 412 when the vehicle 300 travels according to the first trip plan. As shown in FIG. 4, during the first segments 412A, the estimated trip load 400 increases and the onboard stored energy 404 decreases due to consumption of the onboard energy to power the traction motors 314 (shown in FIG. 3) of the vehicle 300 over the non-externally powered first trip segment 412A (e.g., the first trip segment 412A does not include an off-board source of electric energy).

During the second and third trip segments 412B-C, the first estimated trip load 400 increases (and more so for the uphill segment 412C than the flat segment 412B). The onboard stored energy 404, however, remains approximately constant. During these segments 412B-C, the vehicle 300 can use the available off-board energy source to power the traction motors 314. As a result, the onboard stored energy 404 is not depleted during travel over the externally powered segments 412B-C.

During the fourth trip segment 412D, the first estimated trip load 400 continues to increase while the onboard stored energy 404 significantly decreases. The onboard stored energy 404 may significantly decrease due to the additional load needed to propel the vehicle 300 uphill on the segment 412D that is not powered by an off-board electric energy source. In the illustrated embodiment, the estimated trip load 400 exceeds the onboard stored energy 404 in the fourth trip segment 412D. As a result, the vehicle 300 would likely run out of electric energy stored onboard (e.g., in the onboard energy storage device 302) to power the traction motors 314.

In response to this shortage of onboard stored electric energy, the energy management system 326 (shown in FIG. 3) may change the trip plan. The energy management system 326 can change the propulsion operational settings of the first trip plan to create a second trip plan that has the lower estimated trip load 402 over one or more segments 412 of the trip. For example, the energy management system 326 may change the propulsion operational settings of the trip plan to reduce a power output of the traction motors 314. In one embodiment, the energy management system 326 can reduce the energy consumption of the vehicle 300 by causing the vehicle 300 to operate in a degraded state.

The illustrated example shows the second trip plan having lower estimated trip loads 402 over the first four segments 412A-D of the trip. The lower estimated trip loads 402 may be achieved by operating the vehicle 300 at lower throttle settings over the segments 412A-D. The estimated trip load 402 of the second trip plan may exceed the estimated trip load 400 over the fifth and sixth trip segments 412E-F due to higher throttle settings being needed to keep the vehicle 300 moving over a crest in the terrain between the fourth and fifth trip segments 412D, 412E. For example, the first trip plan has a lower estimated trip load 400 in the fifth and sixth trip segments 412E, 412F because the vehicle 300 may be directed to move at faster speeds over the crest and, as a result, the momentum of the vehicle 300 may carry the vehicle 300 with faster speed to travel over the downhill trip segments 412E, 412F. With the lower throttle settings of the second trip plan, however, greater throttle settings may be needed to propel the vehicle 300 over the crest and through the downhill trip segments 412E, 412F to avoid slowing down or interfering with other vehicles traveling behind the vehicle 300. As a result, the estimated trip load 402 of the second trip plan may be greater in the trip segments 412E, 412F.

Due to the modified operational settings of the second trip plan that reduce the estimated trip load 402, the electric energy stored onboard the vehicle 300 may increase for one or more segments 412 of the trip. As shown in FIG. 4, the onboard stored electric energy 406 associated with the second trip plan is increased over the onboard stored electric energy 404 of the first trip plan. The onboard stored electric energy 406 may be depleted at a slower rate during the trip segments 412A, 412D that do not have an off-board energy source. As a result, the onboard stored electric energy 406 remains greater than the estimated trip load 402 of the second trip plan over the course of the trip. Additionally, the onboard stored electric energy 406 may be increased during the fifth trip segment 412E by using dynamic braking of the traction motors 314 to gain additional electric energy. The energy management system 326 is able to modify the trip plan so that the vehicle 300 can travel according to the second trip plan using the onboard stored electric energy.

FIG. 5 illustrates another example of the estimated trip load 400 for the vehicle 300 (shown in FIG. 3) for the trip illustrated in FIG. 4 according to different trip plans. The estimated trip load 400 and the onboard stored electric energy 404 for the first trip plan are shown, along with a modified onboard stored electric energy 500 that is associated with a modified, third trip plan. As described above, the onboard stored electric energy 404 is insufficient to meet the estimated trip load 400 of the first trip plan. In response, the energy management system 326 (shown in FIG. 3) can create or modify the trip plan (e.g., form a third trip plan) so that the onboard stored electric energy is increased during one or more segments 412 of the trip.

For example, during the second, third, and fifth trip segments 412B, 412C, 412E, the trip plan may be modified to the third trip plan that includes directions for the onboard energy storage device 302 (shown in FIG. 3) to acquire (or receive) and store additional electric energy. The onboard stored electric energy 500 can be increased in these trip segments 412B, 412C, 412E, as shown in FIG. 5. With respect to the second and third trip segments 412B-C, this additional electric energy may be supplied from the off-board energy sources. The third trip plan can direct the energy storage device 302 to receive the additional electric energy from wayside stations 106, 108, 202, 208 (shown in FIGS. 1 and 2), a catenary 318 (shown in FIG. 3), an electrified rail, and the like. Alternatively or additionally, this additional electric energy may be supplied from other onboard energy sources, such as from the engine 306 and generator 304 (shown in FIG. 3). With respect to the fifth trip segment 412E, the additional electric energy can be obtained from dynamic braking of the traction motors 314 (shown in FIG. 3). Alternatively, other sources of the electric energy may be used to supplement the onboard stored electric energy.

FIG. 6 illustrates another example of the estimated trip load 400 for the vehicle 300 (shown in FIG. 3) for the trip illustrated in FIG. 4 according to different trip plans. The estimated trip load 400 and the onboard stored electric energy 404 for the first trip plan are shown, along with a modified onboard stored electric energy 600 that is associated with a modified, fourth trip plan. As described above, the onboard stored electric energy 404 is insufficient to meet the estimated trip load 400 of the first trip plan. In response, the energy management system 326 (shown in FIG. 3) can create or modify the trip plan (e.g., form a fourth trip plan) so that the onboard stored electric energy is increased during one or more segments 412 of the trip.

For example, a wayside station 106, 108, 202, 208 (shown in FIGS. 1 and 2) that can provide additional electric energy to the vehicle 300 by charging the onboard energy storage device 302 (shown in FIG. 3) may be located at or near the intersection between the third and fourth trip segments 412C, 412D. The energy management system 326 may create or modify the trip plan to direct the vehicle 300 to stop at the wayside station 106, 108, 202, 208 and at least partially re-charge the onboard energy storage device 302 or otherwise obtain additional electric energy for charging the onboard energy storage device 302. The additional electric energy obtained from the off-board energy source is represented by a charging increase 602 in the onboard stored electric energy 600 of FIG. 6. The charging increase 602 may provide the onboard energy storage device 302 with sufficient electric energy to allow the onboard energy storage device 302 to power the vehicle 300 along the remainder of the trip. While only one charging increase 602 is shown in FIG. 6, alternatively, a greater number of charging increases may be implemented in the trip plan.

The examples described above in connection with FIGS. 4 through 6 describe the energy management system 326 modifying a trip plan to reduce an estimated trip load and/or to add electric energy to the onboard energy storage device 302 of the vehicle 300. In one embodiment, the energy management system 326 uses a combination of the techniques described herein to create and/or modify a trip plan. In one embodiment, a trip plan can include operational settings that cause the vehicle 300 to automatically switch between which onboard source of electric energy is used to power and propel the vehicle 300. For example, over or during one or more segments of a trip (e.g., those segments associated with higher estimated trip loads), the trip plan may direct the controller 322 to automatically switch from using the onboard energy storage device 302 to power the traction motors 314 to using the prime mover (e.g., the engine 304 and generator 306) to power the traction motors 314. Over one or more other segments of the trip (e.g., the segments associated with lower estimated trip loads, restrictions on emissions that may restrict use of the engine 304, and the like), the trip plan may direct the controller 322 to automatically switch from using the prime mover to using the onboard energy storage device 302 to power the traction motors 314.

Additionally or alternatively, the energy management system 326 may modify the trip plan due to an excess of electric energy storage onboard the vehicle 300. If a first trip plan results in the vehicle 300 having an excess of onboard electric energy at one or more locations along the trip, the energy management system 326 can change the trip plan by increasing the power supplied to the vehicle 300. For example, the energy management system 326 can increase the electric energy supplied to the traction motors 314 to increase the power output of the motors 314 and/or increase the speed of the vehicle 300. Alternatively, the energy management system 326 may change the trip plan such that the vehicle 300 supplies at least some of the excess electric energy to an off-board location, such as a wayside station 106, 108, 202, 208 and/or a utility power grid. For example, the energy management system 326 can create or modify the trip plan such that the vehicle 300 has an excess of the electric energy that is conveyed to the wayside station and/or utility power grid via vehicle interface devices of the wayside stations, the catenary 318, or other devices. In one embodiment, different locations may financially compensate the operator or owner of the vehicle 300 for conveying electric energy in this manner. The energy management system 326 may create or modify the trip plan based on difference in the financial compensations. For example, the energy management system 326 may direct the vehicle 300 to supply excess electric energy to an off-board location within a geographic area that provides greater financial compensation than another off-board location in another geographic area that provides smaller financial compensation.

Figure 7:
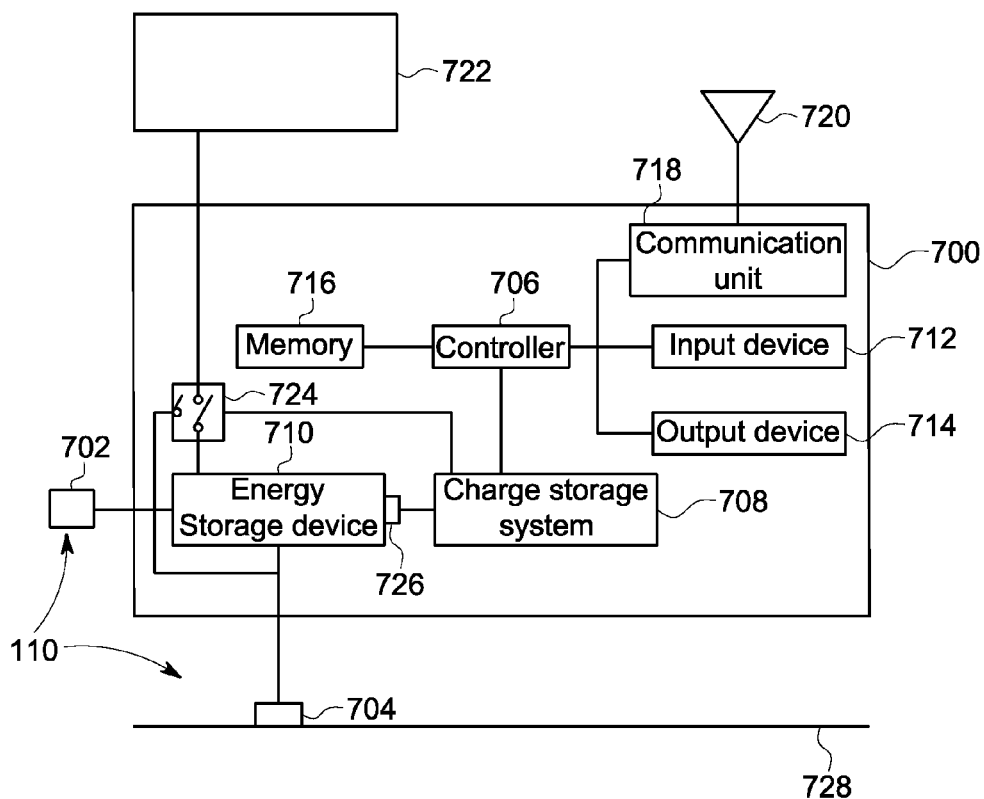
FIG. 7 is a schematic diagram of one embodiment of a wayside station.

FIG. 7 is a schematic diagram of one embodiment of a wayside station 700. The wayside station 700 may represent one of the wayside stations 106, 108, 202, 208 (shown in FIGS. 1 and 2). As described above, several wayside stations 700 may be conductively coupled with an electrical power distribution system, such as the wayside electrical power distribution system 104 (shown in FIG. 1). The wayside stations 700 are configured to provide electric energy (e.g., electric current) to the vehicle 300 (shown in FIG. 3), such as to charge the onboard energy storage device 302 (shown in FIG. 3) of the vehicle 300. The wayside station 700 includes vehicle interface equipment 110 for interfacing with and providing power (e.g., electric energy) to the vehicle 300. The interface equipment 110 can include devices such as a connector 702 that mates with another connector or interface device of the vehicle 300 that is conductively coupled with the onboard energy storage device 302 (such as a device similar to the shoe 330 or pantograph 316 shown in FIG. 3). The interface equipment 110 additionally or alternatively may include a connector 704 that is conductively coupled with a conductor 728 that extends alongside the route 312 (shown in FIG. 3), such as the catenary 318, an electrified rail, and the like.

The wayside station 700 includes a power transfer system (e.g., similar to the power transfer systems 114 shown in FIG. 1) that includes a controller 706, a charge storage system 708, and an off-board energy storage device 710. The energy storage device 710 may represent the energy storage devices 116, 210 (shown in FIGS. 1 and 2) and/or be similar to the energy storage device 302 (shown in FIG. 3), but stored off-board of the vehicle 300 at the wayside station 700. The energy storage device 710 can represent one or more batteries, capacitors, wind turbines, solar cells, and the like.

The controller 706 can include one or more processors, microcontrollers, or other logic-based devices, and/or associated software or instructions, for carrying out one or more operations described herein. The controller 706 controls operations of the wayside station 700, such as by controlling the flow of electric energy (e.g., current) to and from the off-board energy storage device 710 so as to control how much electric energy is stored in the energy storage device 710. The controller 706 may be manually operated by receiving instruction signals from an input device 712 (e.g., a device that receives input from an operator, such as a touchscreen, joystick, keyboard, switch, wheel, microphone, and the like) based on manual input from an operator at the input device 324. An output device 714 (e.g., a display, monitor, touchscreen, speaker, light, and the like) can provide information to the operator, such as an amount of electric energy currently stored in the energy storage device 710, a requested amount of electric energy from an approaching vehicle 300, and the like.

Alternatively or additionally, the controller 706 may be automatically operated to autonomously control how much electric energy is stored at the energy storage device 710. For example, an energy storage plan may be provided by the charge storage system 708 and/or stored on a tangible and non-transitory computer readable storage medium, or memory 716, that is accessible by the controller 706. The energy storage plan may designate how much electric energy (e.g., in terms of joules, amps, and the like) is to be stored in the energy storage device 710 and/or otherwise available at the wayside station 700 for charging the onboard energy storage device 302 of the vehicle 300 with respect to time.

The charge storage system 708 can include one or more processors, microcontrollers, or other logic-based devices, and/or associated software or instructions, for carrying out one or more operations described herein. The charge storage system 708 may designate different amounts of electric energy to be stored in the energy storage device 710 at different times for an energy storage plan based on a storage schedule. The storage schedule may be a designated or predetermined listing, table, or other memory structure, that directs how much electric energy is to be stored in the energy storage device 710 at different times. Such a storage schedule may be created to ensure that more energy is stored and available for conveying to the vehicle 300 during known or identified time periods of larger traffic flow (e.g., during "rush hours" for the vehicles 300) or that less energy is stored during time periods of smaller traffic flow. Additionally or alternatively, the charge storage system 708 may designate different amounts of electric energy to be stored in the energy storage device 710 at different times for the energy storage plan based on a history of demand for electric energy. Such a history may represent how much electric energy is requested by vehicles 300 at different dates, times, and the like. Based on this history, the charge storage system 708 may designate that greater amounts of electric energy be available during future dates and/or times that correspond to previous dates and/or times associated with increased demand. The charge storage system 708 can designate that smaller amounts be available during future dates and/or time that correspond to previous dates and/or times associated with decreased demand.

Additionally or alternatively, the charge storage system 708 may designate different amounts of electric energy to be stored in the energy storage device 710 at different times for the energy storage plan based on requests received from the vehicles 300. The wayside station 700 can include a communication unit 718 (e.g., transceiver circuitry and hardware, such as a wireless antenna 720) that communicates with the vehicle 300 and/or other wayside stations 700. The communication units 718, 332 of the wayside station 700 and the vehicle 300 may be part of the communication system 224 (shown in FIG. 2) to provide the communication functionality 126, 222 (shown in FIGS. 1 and 2) so that the wayside station 700 and vehicle 300 can communicate with each other.

The vehicle 300 can communicate a demand signal to the wayside station 700 as the vehicle 300 moves along the route in order to notify the wayside station 700 of an amount of electric energy requested by the vehicle 300. This amount of energy may be the energy that the vehicle 300 desires to obtain from the wayside station 700 in order to charge the onboard energy storage device 302. For example, if the energy management system 326 of the vehicle 300 calculates a shortage of onboard stored electric energy based on a trip plan, then the energy management system 326 may direct the controller 322 of the vehicle 300 to notify the wayside station 700 of the amount of electric energy that is needed to make up for part or all of this shortage. The demand signal that is sent from the vehicle 300 to the wayside station 700 may include this information, as well as an estimated time of arrival of the vehicle 300 at the wayside station 700.

The charge storage system 708 may determine a total amount of electric energy that is demanded at various times. The total amount of demanded energy can include the energy demanded according to the preset or predetermined energy schedule, the historical energy demand, and/or the energy demanded from vehicles, as described above. While the energy that is demanded based on the energy schedule and/or historical energy demand may be static or have relatively little change over time, the energy demanded from vehicles may change significantly over time and be referred to as an ad hoc, dynamic, and/or variable demand.

The charge storage plan that is created and/or modified by the charge storage system 708 may direct the energy storage device 710 to store an amount of energy that is based on the total amount of demanded electric energy at the times associated with the total amount of demanded energy. In one embodiment, the charge storage system 708 may compare the charge storage plan with a storage capacity of the energy storage device 710 (e.g., the amount of electric energy that the energy storage device 710 is capable of storing at a particular time). If sufficient storage capacity exists at the wayside station 700, then the charge storage system 708 may direct the energy storage device 710 to store at least the total amount of demanded electric energy. The charge storage system 708 may continue to monitor the storage capacity until the vehicle 300 arrives to ensure that sufficient electric energy is available to meet the demand of the vehicle 300.

The charge storage system 708 may modify the energy storage plan if an unexpected (e.g., unplanned) change in the amount of stored electric energy and/or the demanded amount of electric energy changes prior to arrival of the vehicle 300. If the amount of electric energy that will be available when the vehicle 300 arrives is insufficient to meet the demand of the vehicle 300, then the charge storage system 708 may direct the energy storage device 710 to obtain more electric energy from an off-board source 722 prior to arrival of the vehicle 300 and/or to convey electric energy from the off-board source 722 to the vehicle 300 when the vehicle 300 arrives. The off-board source 722 can represent one or more non-vehicle external sources of electric energy, such as remote energy storage devices, utility grids, local renewable power sources or other local power generation sources, and wide area renewable power sources or other wide area power generation sources. Additionally or alternatively, the off-board source 722 can represent another wayside station 700. For example, the off-board source 722 can be a wayside station that is conductively coupled with the wayside station 700 and able to convey electric current to and/or receive electric current from the wayside station 700.

Figure 8:
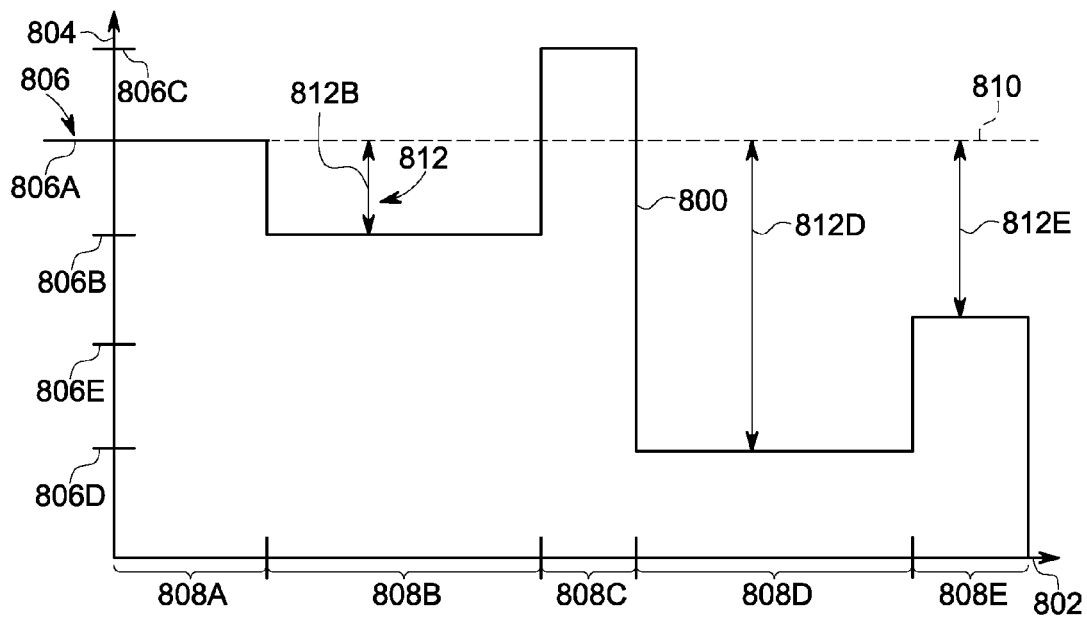
FIG. 8 illustrates one example of electric energy that is demanded from the wayside station shown in FIG. 7.

FIG. 8 illustrates one example of electric energy 800 that is demanded from the wayside station 700 (shown in FIG. 7). The demanded electric energy 800 is shown alongside a horizontal axis 802 representative of time and a vertical axis 804 representative of a total amount of electric energy that is demanded from the wayside station 700. The demanded electric energy 800 can represent the total amount of electric energy that is demanded from the wayside station 700 at different times, and may be based on or include electric energy associated with a preset or predetermined energy schedule, a historical energy demand, and/or the energy that may be demanded from vehicles from time to time.

The charge storage system 708 determines the total demanded electric energy 800 at different time periods. The demanded electric energy 800 changes over time and, as shown in the example of FIG. 8, includes several different amounts 806 (e.g., amounts 806A-E) at different time periods 808 (e.g., time periods 808A-E). The charge storage system 708 can compare the total demanded electric energy 800 to a storage capacity 810 of the off-board energy storage device 710 (shown in FIG. 7) of the wayside station 700. The capacity 810 represents how much electric energy can be stored at the energy storage device 710. In the illustrated example, the total demanded electric energy 800 is at the capacity 810 during the first time period 808A, exceeds the capacity 810 during the third time period 808C, and remains below the capacity 810 at other levels during the second, fourth, and fifth time periods 808B, 808D, 808E.

In one embodiment, the charge storage system 708 monitors an additional or available storage capacity 812 (e.g., additional storage capacities 812B, 812D, 812E) of the energy storage device 710. The additional or available storage capacity 812 represents the difference between the storage capacity 810 of the storage device 710 and the total demanded energy 800 or the actual amount of electric energy stored in the storage device 710 at a corresponding time period. The additional storage capacity 812 represents the amount of additional electric energy that the wayside station 700 can store for providing to the vehicle 300 at the current and/or future time periods 808. Because the charge storage system 708 can determine the total energy demand for future time periods 808, the charge storage system 708 also can determine the additional storage capacity 812 for the future time periods 808.

The charge storage system 708 creates the energy storage plan based on the total demanded electric energy 800 and/or additional storage capacity 812 of the wayside station 700. In one embodiment, the energy storage plan includes designated operational settings of the energy storage device 710 that direct the energy storage device 710 to receive and store designated amounts of electric energy at designated time periods. The amount of electric energy that is stored at the energy storage device 710 at the designated time periods can be referred to as a reserve amount of energy. With respect to the illustrated example, the energy storage plan may direct the energy storage device 710 to store electric energy at the first amount 806A for the first time period 808A, the second amount 806B of electric energy for the second time period 808B, and so on. The energy storage device 710 may be coupled with switches or other components 724 (shown in FIG. 7) that control when the energy storage device 710 receives electric current from one or more sources, such as the off-board energy source 722 (shown in FIG. 7). The charge storage system 708 can operate the switches or other components 724 to turn the flow of electric current from the off-board source 722 to the energy storage device 710 on or off based on the energy storage plan.

For example, the charge storage system 708 may monitor the actual amount of electric energy stored in the energy storage device 710 (e.g., by using an energy sensor 726 coupled with the energy storage device 710) and compare the actual amount to the total demanded electric energy 800 at a current and/or upcoming time period 808. If the actual amount of energy is less than the total demanded energy 800, then the charge storage system 708 may close the switch or other component 724 to cause additional electric current to flow to and charge the energy storage device 710. Alternatively or additionally, the charge storage system 708 can communicate with the off-board source 722 (e.g., via the communication unit 718) to supply the additional electric energy to the energy storage device 710 during time periods 808 of increased demand.

If the energy storage device 710 cannot store sufficient electric energy to meet the demand 800 (e.g., during the time period 808C, when the total energy demanded 800 exceeds the storage capacity 810 such that there is no additional storage capacity 812), then the charge storage system 708 can communicate with the off-board source 722 to supply the electric energy to the vehicle 300. For example, the off-board source 722 may supply some or all of the electric energy during the time period 808C directly to the vehicle 300 (e.g., without flowing through the energy storage device 710) or indirectly to the vehicle 300 (e.g., by first flowing to the energy storage device 710 and then to the vehicle 300). The charge storage system 708 can control this flow of electric energy using the switches or other components 724. The charge storage system 708 may modify the energy storage plan when changes in the total demanded energy 800 occur. For example, if an additional, unplanned amount of electric energy is requested by the vehicle 300, another wayside station, and the like, during a current or upcoming time period 808, the charge storage system 708 can adaptively change the energy storage plan so that the additional electric energy is available at the corresponding time period 808.

The charge storage systems 708 and the vehicles 300 can communicate with each other so that the wayside stations 700 have sufficient electric energy available to charge the onboard energy storage devices 302 of the vehicles 300 and/or directly power the vehicles 300, and so that the vehicles 300 can create and/or modify the trip plans of the vehicles 300 to ensure that the vehicles 300 can travel to and reach the wayside stations 700. In one embodiment, different wayside stations 700 include energy storage devices 710 having different storage capacities 810. The storage capacities 810 may be known to the energy management systems 326 (shown in FIG. 3) of the vehicles 300. For example, the vehicles 300 may communicate with the wayside stations 700 while the vehicles 300 are moving and/or prior to leaving on a trip to determine the storage capacities 810 of the energy storage devices 710 and/or the storage capacities 810 may be stored on the memories 328 (shown in FIG. 3) of the vehicles 300. Based on these storage capacities 810, the energy management system 326 of a vehicle 300 may formulate a trip plan to cause the vehicle 300 to travel to a selected wayside station 700 having a larger storage capacity 810 than one or more other wayside stations 700 in order to recharge the onboard energy storage device 302. Alternatively, the energy management system 326 may create a trip plan that causes the vehicle 300 to travel to several wayside stations 700 having smaller storage capacities 810 in order to partially recharge the onboard energy storage device 302 at each of the stations 700.

In another embodiment, the wayside stations 700 and vehicles 300 may communicate with each other while the vehicles 300 are moving and/or prior to leaving on respective trips so that the vehicles 300 are aware of the additional storage capacities 812 of the stations 700 at one or more future time periods 808. For example, the energy management system 326 may communicate with one or more wayside stations 700 within a designated vicinity and/or those stations 700 disposed along the route 312 being traveled by the vehicle 300. The energy management system 326 may communicate with the charge storage systems 708 of the wayside stations 700 in order to determine the expected additional storage capacities 812 of the wayside stations 700 during one or more upcoming time periods 808.

Based on these additional storage capacities 812 of the different wayside stations 700, the energy management system 326 may select one or more of the wayside stations 700 as locations to recharge the onboard energy storage device 302 of the vehicle 300. For example, the energy management system 326 can select a wayside station 700 that has sufficient additional storage capacity 812 to recharge the onboard energy storage device 302 at a time when the vehicle 300 is expected to arrive at the wayside station 700. The energy management system 326 may create or modify a trip plan that causes the vehicle 300 to travel to the selected wayside station 700 with the onboard energy storage device 302 having sufficient energy to power the vehicle 300 to the selected wayside station 700. As described above, the energy management system 326 can communicate with the selected wayside station 700 to direct the station 700 to have at least a designated amount of available electric energy to recharge the onboard energy storage device 302 when the vehicle 300 arrives.

The energy management system 326 of the vehicle 300 also can monitor changes in the load parameters as the vehicle 300 moves along the route 312 and modify the trip plan while the vehicle 300 is moving. For example, the energy management system 326 may receive updates on the load parameters such as changes in the network traffic congestion between a current location of the vehicle 300 and a destination location or a wayside station, changes in the amount of available energy that is stored at an upcoming wayside station, and the like. The energy management system 326 can examine the trip plan to determine if these updates to the load parameters cause the estimated trip load to exceed the total electric energy that is available to power the vehicle 300 at one or more locations. If the updates do result in the estimated trip load exceeding the available electric energy, then the energy management system 326 can modify the trip plan to reduce the estimated trip load (e.g., by operating at slower speeds) and/or acquire additional electric current from another source (e.g., by taking a different route having a powered catenary 318 or powered section of the route).

Figure 13:
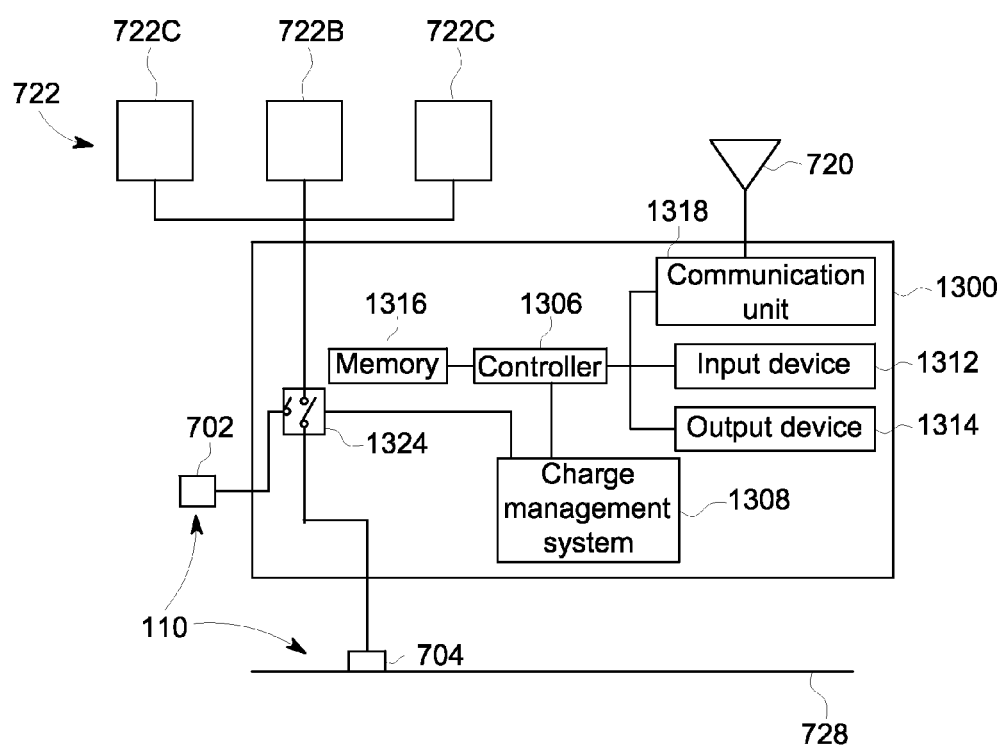
FIG. 13 is a schematic diagram of another embodiment of a wayside station.

FIG. 13 is a schematic diagram of another embodiment of a wayside station 1300. The wayside station 1300 may represent one of the wayside stations 106, 108, 202, 208 (shown in FIGS. 1 and 2). As described above, several wayside stations 1300 may be conductively coupled with an electrical power distribution system, such as the wayside electrical power distribution system 104 (shown in FIG. 1). The wayside stations 1300 are configured to provide electric energy (e.g., electric current) to the vehicle 300 (shown in FIG. 3), such as to charge the onboard energy storage device 302 (shown in FIG. 3) of the vehicle 300. The wayside station 1300 includes the vehicle interface equipment 110 for interfacing with and providing power (e.g., electric energy) to the vehicle 300.

The wayside station 1300 includes a power transfer system (e.g., similar to the power transfer systems 114 shown in FIG. 1) that includes a controller 1306 and a charge management system 1308. The controller 1306 can include one or more processors, microcontrollers, or other logic-based devices, and/or associated software or instructions, for carrying out one or more operations described herein. The controller 1306 controls operations of the wayside station 1300, such as by controlling the flow of electric energy (e.g., current) from two or more off-board sources 722 of energy (e.g., sources 722A-C in the illustrated embodiment, although another number of sources 722 may be used).

The controller 1306 may be manually operated by receiving instruction signals from an input device 1312 (e.g., a device that receives input from an operator, such as a touchscreen, joystick, keyboard, switch, wheel, microphone, and the like) based on manual input from an operator at the input device 1312. An output device 1314 (e.g., a display, monitor, touchscreen, speaker, light, and the like) can provide information to the operator, such as an amount of electric energy being supplied by one or more of the off-board sources 722, a requested amount of electric energy from an approaching vehicle 300, and the like.

Alternatively or additionally, the controller 1306 may be automatically operated to autonomously control how much electric energy is provided from one or more of the off-board sources 722. For example, an energy allocation plan may be provided by the charge management system 1308 and/or stored on a tangible and non-transitory computer readable storage medium, or memory 1316, that is accessible by the controller 1306. The energy allocation plan may designate how much electric energy (e.g., in terms of joules, amps, and the like) is to be provided by the different sources 722 for charging the onboard energy storage device 302 of the vehicle 300 and/or powering the vehicle 300 at different time periods.

The charge management system 1308 can include one or more processors, microcontrollers, or other logic-based devices, and/or associated software or instructions, for carrying out one or more operations described herein. The charge management system 1308 may designate different amounts of electric energy to be supplied by different individual off-board sources 722 or different combinations of the off-board sources 722 at different times to establish the energy allocation plan. The allocation plan may be a designated or predetermined listing, table, or other memory structure, that directs how much electric energy is to be supplied by one or more of the different off-board sources 722 at different times. Such an allocation plan may be created to ensure that sufficient energy is available and/or provided for conveying to the vehicle 300 during known or identified time periods of larger traffic flow (e.g., during "rush hours" for the vehicles 300) or that less energy is provided during time periods of smaller traffic flow. Additionally or alternatively, the charge management system 1308 may designate different amounts of electric energy to be provided by the different off-board sources 722 at different times for the energy storage plan based on a history of demand for electric energy. Such a history may represent how much electric energy is requested by vehicles 300 at different dates, times, and the like. Based on this history, the charge management system 1308 may designate that greater amounts of electric energy be available during future dates and/or times that correspond to previous dates and/or times associated with increased demand. The charge management system 1308 can designate that smaller amounts be available during future dates and/or time that correspond to previous dates and/or times associated with decreased demand.

The charge management system 1308 can create the energy allocation plan based on differences in financial costs of energy supplied by the different off-board sources 722. For example, the off-board source 722A may provide more expensive energy than the off-board source 722B during a first time period but less expensive energy than the off-board source 722B and/or 722C during a different, second time period. The charge management system 1308 can create the energy allocation plan such that less energy is provided by the off-board source 722A during the first time period (and/or more energy is provided by the off-board source 722B and/or 722C) and that more energy is provided by the off-board source 722A during the second time period (and/or less energy is provided by the off-board source 722B and/or 722C).

Additionally or alternatively, the charge management system 1308 may designate different amounts of electric energy to be provided by different ones of the off-board sources 722 at different times for the energy allocation plan based on requests received from the vehicles 300. The wayside station 1300 can include a communication unit 1318 (e.g., transceiver circuitry and hardware, such as a wireless antenna 720) that communicates with the vehicle 300 and/or other wayside stations 1300. The communication units 1318, 332 of the wayside station 1300 and the vehicle 300 may be part of the communication system 224 (shown in FIG. 2) to provide the communication functionality 126, 222 (shown in FIGS. 1 and 2) so that the wayside station 1300 and vehicle 300 can communicate with each other.

Similar to as described above in connection with the wayside station 700 shown in FIG. 7, the vehicle 300 can communicate a demand signal to the wayside station 1300 as the vehicle 300 moves along the route in order to notify the wayside station 1300 of an amount of electric energy requested by the vehicle 300. The demand signal that is sent from the vehicle 300 to the wayside station 1300 may include this information, as well as an estimated time of arrival of the vehicle 300 at the wayside station 700.

The charge management system 1308 may determine a total amount of electric energy that is demanded at various times, similar to as described above in connection with the charge storage system 708 shown in FIG. 7. The energy allocation plan that is created and/or modified by the charge management system 1308 may be used to control the flow of energy from one or more of the off-board sources 722 over time. For example, the charge management system 1308 may determine the demanded electric energy that is demanded over time similar to the demanded electric energy 800 shown in FIG. 8.

The charge management system 1308 creates the energy allocation plan based on the demanded electric energy. In one embodiment, the energy allocation plan includes designated amounts of electric energy that are to be supplied by the different off-board sources 722 at designated time periods to meet some or all of the demanded electric energy at different times. The charge management system 1308 can be coupled with one or more switches or other components 1324. The switches or other components 1324 can individually control the flow of electric energy from each of the off-board sources 722. For example, the switches or other components 1324 can control when electric current flows from each of the off-board sources 722. The charge management system 1308 can operate the switches or other components 1324 to turn the flow of electric current from each of the off-board sources 722 based on the energy allocation plan. For example, the charge management system 1308 can direct the switches or other components 1324 to allow the off-board source 722A to supply electric current to the vehicle 300 while blocking the flow of electric current from the off-board source 722B and/or 722C during a first time period, to allow the off-board source 722B to supply electric current to the vehicle 300 while blocking the flow of electric current from the off-board source 722A and/or 722C during a subsequent, second time period, to allow the off-board source 722C (and/or 722A or 722B) to supply electric current to the vehicle 300 while blocking the flow of electric current from the off-board source 722A and/or 722B during a subsequent, third time period according to the energy allocation plan.

Figure 9:
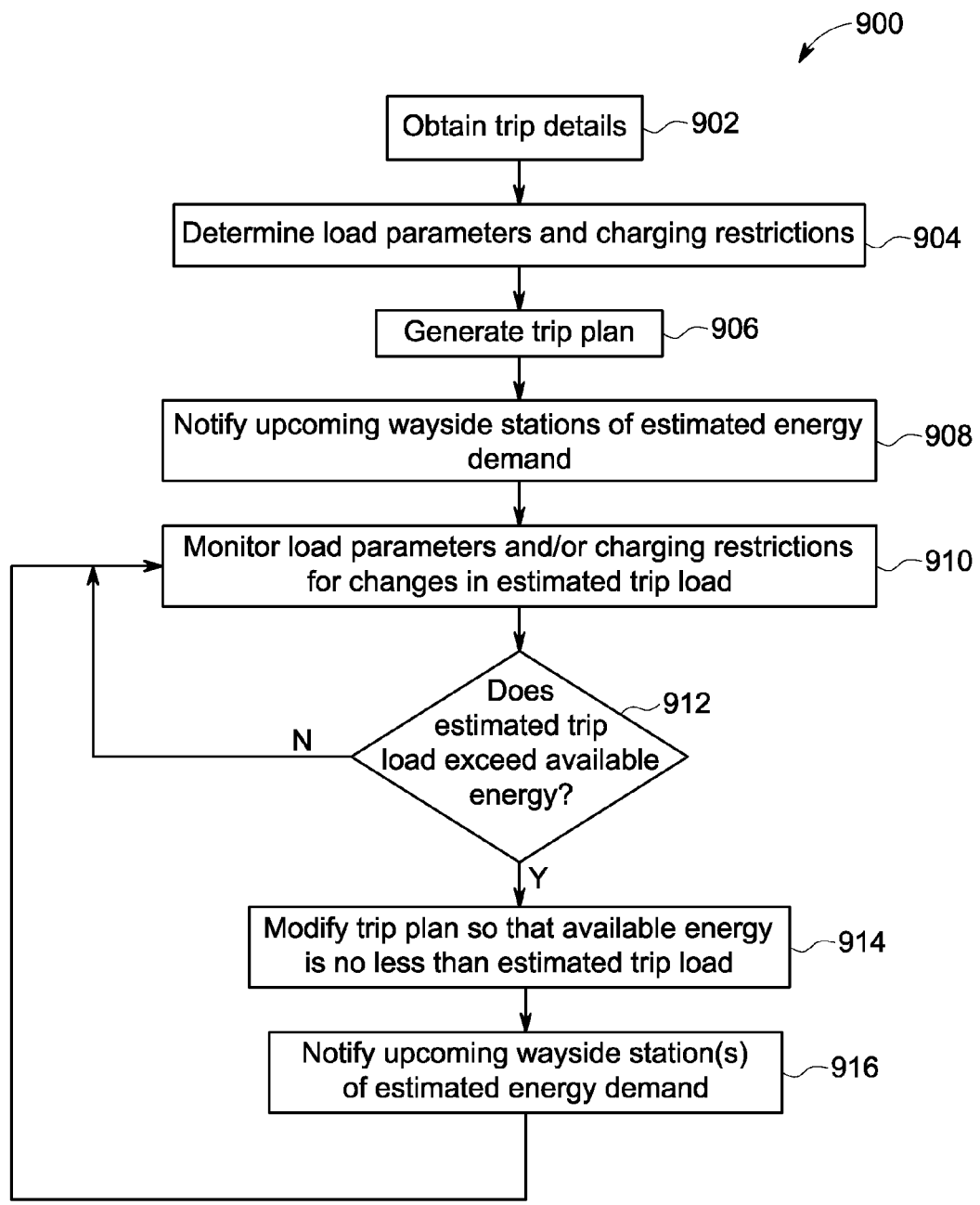
FIG. 9 illustrates a flowchart of one embodiment of a method for controlling and/or powering a vehicle.

FIG. 9 illustrates a flowchart of one embodiment of a method 900 for controlling and/or powering a vehicle. The method 900 may be used in conjunction with one or more embodiments of the systems described above. At 902, details of a trip for a vehicle are obtained. For example, a destination location, a scheduled or desired time of arrival, restrictions on which routes can be traveled along, and the like, can be received by the energy management system 326 (shown in FIG. 3) of the vehicle 300 (shown in FIG. 3).

At 904, load parameters and charging restrictions for the trip are determined. For example, the weight of the vehicle 300, the grade of one or more segments of the route 312 (shown in FIG. 3) over which the vehicle 300 will travel for the trip, efficiencies of the traction motors 314 (shown in FIG. 3) of the vehicle 300, the amount of electric energy consumed by other electric loads of the vehicle 300, transportation network congestion that impacts (e.g., slows down) travel along the route 312 of the trip, limitations on the amount of energy that can be stored by the onboard energy storage device 302 (shown in FIG. 3) of the vehicle 300, an amount of energy that is currently stored in the onboard energy storage device 302, the number of onboard energy storage devices 302 onboard the vehicle 300, resistance losses of the vehicle 300, locations of off-board energy sources (e.g., the distances to and/or between the wayside stations 700 shown in FIG. 7 and/or the powered sections of the route 312), the amount of energy that is available for charging the onboard energy storage device 302 at one or more of the off-board energy sources, a charging capacity at one or more of the off-board energy sources, locations or segments of the route 312 where no off-board energy sources are available, the financial cost of obtaining electric energy from the off board energy sources, and the like, may be received. This information may be communicated to the energy management system 326, such as by being input by an operator of the vehicle 300 or transmitted from an off-board location.

At 906, a trip plan for the vehicle to travel along the route for the trip is generated. As described above, the trip plan includes designated operational settings of the vehicle 300 at various locations of the trip. The energy management system 326 can calculate the estimated trip loads of the trip based on the operational settings, the load parameters, and/or the charging restrictions.

At 908, upcoming wayside stations are notified of the estimated energy demand of the vehicle. For example, the energy management system 326 can calculate how much electric energy may be needed to recharge the onboard energy storage device 302 from one or more wayside stations 700 disposed along the route 312 of the trip. The energy management system 326 can notify these stations 700 of the amount of electric energy that will be needed and/or when the vehicle 300 is expected or scheduled to arrive at the wayside station 700.

At 910, the load parameters and/or charging restrictions are monitored as the vehicle travels along the trip for changes. The load parameters and/or charging restrictions can be monitored in order to identify changes that cause the estimated trip loads of the previously generated trip plan to change. Changes in the load parameters and/or charging restrictions can be monitored by an operator of the vehicle 300, by the energy management system 326 or controller 322 (e.g., using one or more sensors), by communications from an off-board location, and the like.

At 912, a determination is made as to whether any changes in the estimated trip loads of the previously generated trip plan cause the estimated trip loads to exceed the electric energy that is available to power the vehicle. For example, the energy management system 326 can determine if an increase in an estimated trip load for an upcoming portion of the trip (e.g., that is caused by a change in a load parameter and/or charging restriction) results in the vehicle 300 having insufficient electric energy (e.g., stored in the onboard energy storage device 302) to power the vehicle 300 to a designated location of the trip plan. If there is insufficient electric energy, then the trip plan may need to be modified. As a result, flow of the method 900 may proceed to 914. On the other hand, if there still is sufficient electric energy, then the trip plan may not need to be modified. As a result, flow of the method 900 can return to 910, where the load parameters and/or charging restrictions continue to be monitored as the vehicle 300 travels along the route 312. Alternatively, even if there is still sufficient electric energy to meet the changed estimated trip load, flow of the method 900 may continue to 914 in order to determine if the trip plan can be modified to preserve additional electric energy stored onboard the vehicle 300 for one or more additional portions of the trip, to avoid having to obtain additional electric energy from a wayside station 700, and the like.

At 914, the trip plan is modified so that the electric energy that is available to the vehicle is no less than the estimated trip load. For example, the energy management system 326 can change the designated operational settings of the vehicle 300, change when and/or where the vehicle 300 obtains additional electric energy, and/or change which onboard power source is used by the vehicle 300 (e.g., the energy storage device 302 or the prime mover) to propel the vehicle 300 at one or more locations of the trip. These changes may be made to reduce the estimated trip load for one or more segments of the trip and/or to reduce the consumption of electric energy stored onboard the vehicle 300.

At 916, upcoming wayside stations are notified of the estimated energy demand of the vehicle based on the modified trip plan. For example, the changes to the trip plan may result in the vehicle 300 stopping at a different upcoming wayside station 700 for charging the onboard energy storage device 302, obtaining a different amount of electric energy from the wayside station 700 (relative to what was previously reported to or requested from the wayside station 700 at 908), and/or arriving at the wayside station 700 at a different time (relative to what was previously reported to or requested from the wayside station 700 at 908). The estimated energy demand from the modified trip plan may be communicated to the different wayside station 700, the different amount of energy that is demanded may be communicated to the wayside station 700, and/or the different time of arrival may be communicated to the wayside station 700. This information may be communicated so that the wayside station 700 has sufficient electric energy to charge the onboard storage device 302 of the vehicle 300 when the vehicle 300 arrives. Flow of the method 900 may then return to 910. The method 900 may continue in a loop-wise manner until the trip is terminated.

Figure 10:
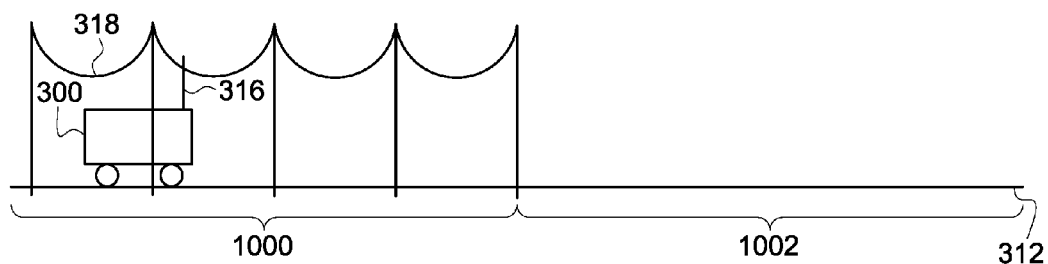
FIG. 10 illustrates operation of the vehicle shown in FIG. 3 in accordance with one or more embodiments of the subject matter described herein.

FIG. 10 illustrates operation of the vehicle 300 in accordance with one or more embodiments of the subject matter described herein. In the illustrated embodiment, the vehicle 300 travels along the route 312 that includes a powered portion 1000 and an unpowered portion 1002. The powered portion 1000 includes external power sources, such as the catenaries 318 and/or an electrified rail. The unpowered portion 1002 does not include any external power sources. For example, the unpowered portion 1002 does not include any off-board sources of electric current that can power the vehicle 300:

The vehicle 300 may use the energy management system 326 and the onboard energy storage device 302 to travel along the powered and unpowered portions 1000, 1002 of the route 312. The energy management system 326 can generate a trip plan for the vehicle 300 that designates operational settings of the vehicle 300 so that the vehicle 300 has sufficient energy stored in the onboard energy storage device 302 to propel the vehicle 300 through the powered and unpowered portions 1000, 1002. The energy management system 326 can monitor the state of charge of the energy storage device 302 (e.g., an amount of stored energy that is currently available) and/or one or more performance characteristics of the energy storage device 302. The performance characteristics can represent the health of the energy storage device 302, and can include specific gravity of the energy storage device 302, voltage stored in the energy storage device 302, results of a load test of the energy storage device 302, and the like. Based on the load parameters, charging restrictions, state of charge, and the performance characteristics described above, the energy management system 326 generates the trip plan, also as described above.

In one embodiment, the trip plan may direct the controller 322 to charge the energy storage device 302 using the energy from the catenary 318 (and/or electrified rail or other off-board energy source) while the vehicle 300 travels through the powered portion 1000 of the route 312. Alternatively or additionally, the trip plan may direct the controller 322 to charge the energy storage device 302 using electric energy generated by the alternator 304 while the traction motors 314 are powered by the catenary 318 (and/or electrified rail or other off-board energy source).

The energy management system 326 may create and/or modify the trip plan as the vehicle 300 travels based on a variety of factors, such as previously acquired characteristics of the route 312 (e.g., the grade, curvature, friction, and the like, of the route 312 that was measured during a previous trip of the vehicle 300 or another vehicle along the route 312), currently acquired characteristics of the route 312 (e.g., characteristics that are measured by onboard sensors of the vehicle 300 during the current trip), the current state of charge of the energy storage device 302, and/or the performance characteristics of the energy storage device 302. As described above, the trip plan may be generated to ensure that the vehicle 300 can be powered to travel to a destination, taking into account that the vehicle 300 will have an external source of energy during the powered portion 1000 but not during the unpowered portion 1002. For example, the trip plan may direct the vehicle 300 to consume more electric energy (e.g., by traveling at faster speeds, greater torque settings for the traction motors 314, charging the energy storage device 302 from the catenary 318, and the like) while in the powered portion 1000 but consume less electric energy from the onboard energy storage device 302 (e.g., by traveling at slower speeds, using smaller torque settings, slower accelerations, using regenerative braking to charge the energy storage device 302, and the like) while in the unpowered portion 1002 so that the vehicle 300 has sufficient energy to reach the destination.

The energy management system 326 may modify the trip plan while the vehicle 300 is traveling based on unplanned events or occurrences. For example, the trip plan may be previously created based on an assumption that the vehicle 300 will be able to obtain at least a designated amount of electric energy from the catenary 318, regenerative braking using the traction motors 314, and the like. But, during actual travel of the vehicle 300, the amount of electric energy that is obtained from the catenary 318, regenerative braking, and the like, may be less than designated amount. For example, the amount of current supplied by the catenary 318 may be less than expected due to an increased amount of traffic (e.g., other vehicles) concurrently drawing electric current from the catenary 318 at the same time. When the amount of energy that is actually obtained to power the vehicle 300 and/or charge the energy storage device 302 is different (e.g., less) than the expected or planned amount of energy of the trip plan, then the energy management system 326 may modify the designated operational settings of the trip plan. For example, the energy management system 326 may reduce the speed, torque, acceleration, and the like, settings of the vehicle 300 that are designated by the trip plan. The energy management system 326 can monitor the amount of energy that is actually received from the catenary 318, regenerative braking, and the like, by monitoring the current that flows through the control system 340 of the vehicle 300.

Figure 11:
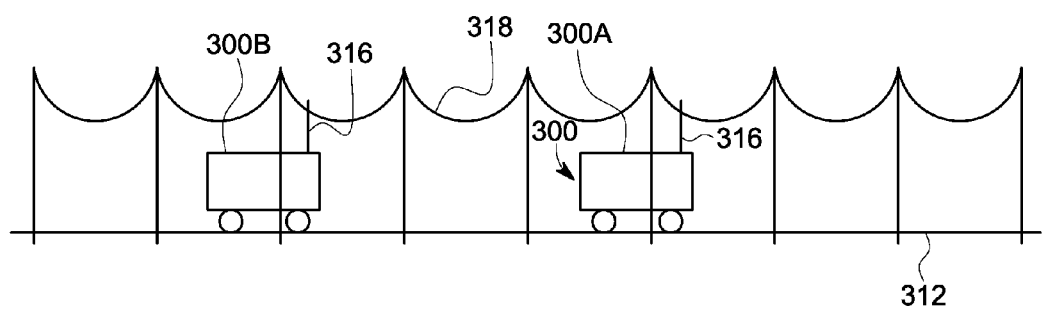
FIG. 11 illustrates operation of plural vehicles shown in FIG. 3 in accordance with one or more embodiments of the subject matter described herein.
Figure 12:
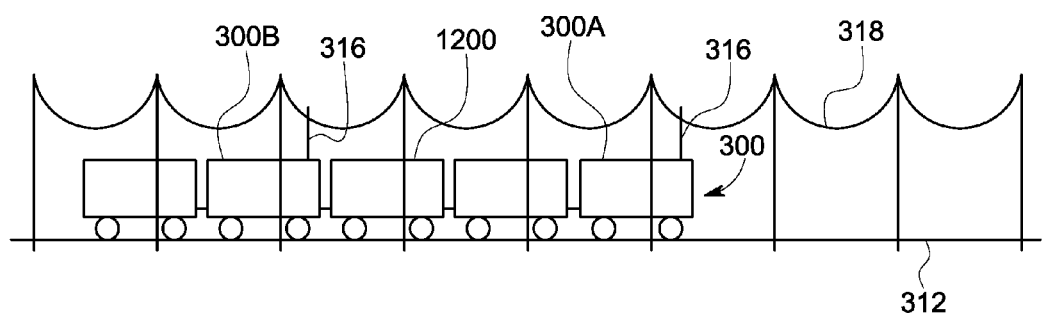
FIG. 12 illustrates other operation of plural vehicles shown in FIG. 3 in accordance with one or more embodiments of the subject matter described herein.

FIGS. 11 and 12 illustrate operation of plural vehicles 300 (e.g., vehicles 300A and 300B) in accordance with one or more embodiments of the subject matter described herein. In the illustrated embodiment, the vehicles 300 travel along the route 312 that includes an external power source, such as the catenaries 318 and/or an electrified rail. The vehicles 300 may concurrently travel along the route 312 such that both vehicles 300 concurrently draw electric current from the catenary 318 (or other external power source). While only two vehicles 300 are shown, alternatively, more vehicles 300 may concurrently draw power from the catenary 318. Additionally, the vehicles 300 are separate and not connected with each other. Alternatively, the vehicles 300 may be connected with each other, such as by one or more non-powered units 1200 (e.g., rail cars or other vehicles that are not capable of self-propulsion), as shown in the embodiment of FIG. 12.

In the one embodiment, the vehicles 300 may communicate with each other in order to coordinate the consumption and/or transfer of electric current by the vehicles 300. For example, the vehicles 300 may coordinate how much electric current each vehicle 300 draws from the catenary 318 at various locations and/or points in time. The energy management systems 326 of the vehicles 300 may communicate with each other so that the total energy that is concurrently drawn by the vehicles 300 from the catenary 318 does not exceed a designated threshold, such as an upper limit on the amount of electric current that the catenary 318 is capable of conveying and/or a current amount of electric current that is being conveyed by the catenary 318.

The energy management systems 326 can coordinate with each other as to how much current each vehicle 300 draws from the catenary 318 so that the vehicles 300 have sufficient electric current to meet the needs of the trip plan(s) being used by the vehicles 300. For example, the vehicle 300A may communicate how much electric current that the vehicle 300A needs from the catenary 318 in order to power the vehicle 300A and/or to charge the energy storage device 302 of the vehicle 300A according to the trip plan of the vehicle 300A to the other vehicle 300B. The vehicle 300B may use this information to limit how much current that the vehicle 300B draws from the catenary 318 and/or to modify the trip plan of the vehicle 300B so that the total current drawn by the vehicles 300 from the catenary 318 does not exceed a designated threshold, such as an upper limit on the amount of electric current that the catenary 318 is capable of conveying and/or a current amount of electric current that is being conveyed by the catenary 318. Similarly, the vehicle 300B may communicate how much electric current that the vehicle 300B needs from the catenary 318 in order to power the vehicle 300B and/or to charge the energy storage device 302 of the vehicle 300B according to the trip plan of the vehicle 300B to the other vehicle 300A. The vehicle 300A may use this information to limit how much current that the vehicle 300A draws from the catenary 318 and/or to modify the trip plan of the vehicle 300A, as described above.

In one embodiment, the vehicles 300 can communicate with each other in order to determine whether to transfer electric energy between each other. The vehicles 300 may each assess a mission need for energy from the catenary 318 (or other off-board power source). This mission need for each vehicle 300 may represent the amount of electric current that is needed to charge the energy storage device 302 of the vehicle 300 and/or to power the vehicle 300 to reach a designated location, such as the destination of the vehicle 300. The mission needs of the vehicles 300 are communicated with each other (e.g., wirelessly using the communication units 332 and/or through wired connections of the connected vehicles 300 shown in FIG. 12).

The energy management system 326 of one or more of the vehicles 300 compares the mission needs of the vehicles 300 to determine if one vehicle 300 has a greater need for electric current than the other vehicle 300. Additionally, the amount of electric energy stored onboard the vehicles 300 may be communicated. The energy management system 326 may examine the mission needs and/or the amount of stored energies to establish a charge transfer option. A charge transfer option represents a modification to the trip plan of one or more of the vehicles 300 that includes directions to transfer stored electric energy from one vehicle 300A or 300B to the other vehicle 300B or 300A, such as through the catenary 318.

The energy management system 326 of the vehicle 300A that is to transmit energy to the other vehicle 300B can examine how much energy is to be transferred and compare this amount of energy to the energy stored onboard the same vehicle 300A. If the amount of energy to be transferred is smaller than the amount of stored energy, then the energy management system 326 can examine the trip plan for the vehicle 300A to determine if the trip plan needs to be modified due to the transfer of energy. For example, the transfer of energy may cause the vehicle 300A to have insufficient energy to follow the trip plan. The trip plan may then need to be modified in order to reduce the amount of energy consumed by the vehicle 300A, as described above. The vehicle 300A may then transfer energy to the vehicle 300B, such as by discharging electric current from the energy storage device 302 of the vehicle 300A through the catenary 318 to the energy storage device 302 of the vehicle 300B.

As described above, the wayside stations 700 can provide additional electric energy to the vehicles 300 in order to assist the vehicles 300 in reaching destinations along the route 312. The wayside stations 700 may be single, stand alone stations (e.g., although coupled with a source of energy, as described above) or multiple stations that are interconnected so that the stations can transfer electric current between the stations. The availability of electric current from the wayside stations 700 may be incorporated into the trip plans generated by the energy management systems 326. For example, the energy management systems 326 can create trip plans that direct the vehicles 300 to acquire additional electric energy from one or more wayside stations 700. The additional electric energy may be used as a "power boost," such as the addition of electric energy that allows the vehicle 300 to travel at faster speeds, greater accelerations, and the like, that the vehicle 300 would otherwise be unable to do using just energy from the onboard energy storage device 302 while still reaching a designated destination of a trip plan. Alternatively or additionally, the additional electric energy may be used to ensure that the vehicle 300 has sufficient electric energy to reach a designated destination of a trip plan.

In another embodiment, a control system (e.g., for controlling operations of a vehicle) includes a controller and an energy management system. The controller is configured to be disposed onboard a vehicle that includes one or more motors that propel the vehicle along a route during a trip and an onboard energy storage device for storing at least some of the electric energy used to power the one or more motors. The controller also is configured to control operations of the one or more motors according to a trip plan that designates operational settings of the one or more motors during the trip. The energy management system may be configured to be communicatively coupled with the controller. The energy management system is configured to calculate estimated electric loads of powering the one or more motors over one or more segments of the trip according to the designated operational settings of the trip plan and determine a demanded amount of electric energy for powering the vehicle based on one or more of the estimated electric loads. The demanded amount of electric energy is based on a stored amount of electric energy in the onboard energy storage device. The energy management system is further configured to communicate the demanded amount of electric energy to one or more of plural wayside stations disposed along the route so that the wayside stations have sufficient electric energy to charge the onboard energy storage device with the electric energy to meet the one or more of the estimated electric loads.

In another aspect, the energy management system is configured to compare the one or more of the estimated electric loads with the stored amount of electric energy in the onboard energy storage device and to change one or more of the operational settings of the trip plan based on a difference between the one or more estimated electric loads and the stored amount of electric energy.

In another aspect, the energy management system is configured to change the one or more of the operational settings of the trip plan for an upcoming portion of the trip to reduce the estimated electric load for the upcoming portion of the trip when the estimated electric load exceeds the stored amount of electric energy for the upcoming portion of the trip.

In another aspect, at least one of the estimated electric loads calculated by the energy management system represents an amount of electric energy that is calculated to be consumed to propel the vehicle through an unpowered segment of the route from a first powered segment to a second powered segment. The first and second powered segments represent portions of the route that have external sources of electric energy extending alongside the route for at least one of charging the onboard energy source or powering the one or more motors.

In another aspect, the estimated electric loads are associated with electric loads used to power the vehicle to different designated locations along the route. The energy management system is configured to compare the estimated electric loads and to at least one of generate or modify the trip plan based on the estimated electric loads so that the vehicle has sufficient electric energy stored in the onboard energy source to travel to the designated location associated with at least one of the estimated electric loads.

In another aspect, the energy management system is configured to at least one of generate or modify the trip plan so that there is sufficient electric energy available to the vehicle to travel to the wayside stations having a lower cost of charging the onboard energy storage device relative to one or more other wayside stations.

In another aspect, the energy management system is configured to determine at least one of total energy storage capacities or available energy storage capacities of the wayside stations, determine additional estimated electric loads that are representative of amounts of the electric energy used to propel the vehicle to the wayside stations, compare the at least one of the total energy storage capacities or the available energy storage capacities of the wayside stations, and to at least one of generate or modify the trip plan based on the additional estimated electric loads and the at least one of the total energy storage capacities or the available energy storage capacities of the wayside stations that are compared.

In another aspect, the energy management system is configured to calculate the estimated electric loads based on one or more of transportation network congestion that is representative of an amount of vehicular traffic in a transportation network that includes the route, a scheduled time of arrival of the vehicle at one or more designated locations, a grade of one or more segments of the route, a speed limit associated with one or more segments of the route, a size of the vehicle, a weight of the vehicle, a power output of the vehicle, or a rate of electric energy consumption of the vehicle.

In another aspect, the energy management system is configured to calculate the estimated electric loads based on charging restrictions that limit at least one of when the vehicle can obtain additional electric energy to charge the onboard energy storage device, where the vehicle can obtain additional electric energy to charge the onboard energy storage device, or how much additional electric energy the vehicle can obtain to charge the onboard energy storage device.

In another aspect, the charging restrictions include one or more of a distance along the route to the wayside charging stations, amounts of reserve electric energy at the wayside stations that will be available for the vehicle to charge the onboard energy storage device when the vehicle arrives at the wayside stations, or financial costs of charging the onboard energy storage device at the wayside stations.

In another aspect, the trip plan directs the vehicle to automatically switch between powering the one or more motors using the electric energy stored in the onboard energy storage device and powering the one or more motors using electric energy generated onboard the vehicle from a generator.

In another aspect, the operational settings of the trip plan include at least one of throttle settings, power outputs, or speeds of the vehicle that are expressed as a function of at least one of time or distance along the route.

In another aspect, the energy management system is configured to communicate an estimated time of arrival with the demanded amount of electric energy to the one or more of plural wayside stations disposed along the route so that the wayside stations have sufficient electric energy to charge the onboard energy storage device of the vehicle when the vehicle arrives.

In another embodiment, a control system (e.g., for controlling charging of a vehicle) includes a controller and a charge storage system. The controller is configured to be disposed at a wayside station having an off-board energy storage device that charges an onboard energy storage device of a vehicle traveling along a route during a trip. The controller also is configured to communicate with the vehicle as the vehicle travels along the route in order to determine a demanded amount of electric energy from the vehicle. The charge storage system is configured to be communicatively coupled with the controller and the off-board energy storage device at the wayside station. The charge storage system also is configured to at least one of generate or modify an energy storage plan that designates how much of the electric energy is to be stored in the off-board energy storage device during different time periods based on the demanded amount of electric energy that is received from the vehicle.

In another aspect, the controller is configured to receive an estimated time of arrival from the vehicle and the charge storage system is configured to direct the off-board energy storage device to acquire additional electric energy to meet the demanded amount of electric energy of the vehicle prior to arrival of the vehicle.

In another aspect, the charge storage system is configured to at least one of generate or modify the energy storage plan so that at least a total amount of demanded electric energy is stored in the off-board energy storage device. The total amount of demanded electric energy includes the demanded amount of electric energy from the vehicle and an amount of electric energy obtained from at least one of a predetermined energy schedule of the wayside station or a history of prior electric energy demands communicated to the wayside station.

In another aspect, the charge storage system is configured to compare the charge storage plan with a storage capacity of the off-board energy storage device and to direct an off-board electric energy source other than the off-board energy storage device to supply electric current to the vehicle when the demanded amount of electric energy from the vehicle exceeds the storage capacity of the off-board energy storage device.

In another embodiment, a method (e.g., for controlling operations of a vehicle) includes calculating estimated electric loads of powering one or more motors of a vehicle with electric energy stored in an onboard energy storage device over one or more segments of a trip according to designated operational settings of a trip plan. The method also includes determining a demanded amount of the electric energy for powering the vehicle based on one or more of the estimated electric loads. The demanded amount of electric energy is based on a stored amount of electric energy in the onboard energy storage device. The method further includes communicating the demanded amount of electric energy to one or more of plural wayside stations disposed along a route of the trip so that at least a selected station of the wayside stations has sufficient electric energy to charge the onboard energy storage device with the electric energy to meet the one or more of the estimated electric loads when the vehicle arrives at the selected station.

In another aspect, the method also includes comparing the one or more of the estimated electric loads with the stored amount of electric energy in the onboard energy storage device and changing one or more of the operational settings of the trip plan based on a difference between the one or more estimated electric loads and the stored amount of electric energy.

In another aspect, the one or more of the operational settings of the trip plan are changed for an upcoming portion of the trip to reduce the estimated electric load for the upcoming portion of the trip when the estimated electric load exceeds the stored amount of electric energy for the upcoming portion of the trip.

In another aspect, at least one of the estimated electric loads represents an amount of electric energy that is stored in the onboard energy storage device and that is calculated to be consumed to propel the vehicle through an unpowered segment of the route from a first powered segment to a second powered segment. The first and second powered segments represent portions of the route that have external sources of electric energy extending alongside the route for at least one of charging the onboard energy source or powering the one or more motors.

In another aspect, the method also includes at least one of generating or modifying the trip plan so that there is sufficient electric energy available to the vehicle to travel to the wayside stations having a lower cost of charging the onboard energy storage device relative to one or more other wayside stations.

In another aspect, the estimated electric loads are calculated based on one or more of transportation network congestion that is representative of an amount of vehicular traffic in a transportation network that includes the route, a scheduled time of arrival of the vehicle at one or more designated locations, a grade of one or more segments of the route, a speed limit associated with one or more segments of the route, a size of the vehicle, a weight of the vehicle, a power output of the vehicle, or a rate of electric energy consumption of the vehicle.

In another aspect, the estimated electric loads are calculated based on charging restrictions that limit at least one of when the vehicle can obtain additional electric energy to charge the onboard energy storage device. The vehicle can obtain additional electric energy to charge the onboard energy storage device, or how much additional electric energy the vehicle can obtain to charge the onboard energy storage device.

In another aspect, the charging restrictions include one or more of a distance along the route to the wayside charging stations, amounts of reserve electric energy at the wayside stations that will be available for the vehicle to charge the onboard energy storage device when the vehicle arrives at the wayside stations, or financial costs of charging the onboard energy storage device at the wayside stations.

In another aspect, the operational settings of the trip plan include at least one of throttle settings, power outputs, or speeds of the vehicle that are expressed as a function of at least one of time or distance along the route.

In another aspect, the method also includes communicating an estimated time of arrival with the demanded amount of electric energy to the selected station of the wayside stations so that the selected station has sufficient electric energy to charge the onboard energy storage device of the vehicle when the vehicle arrives at the selected station.

In another embodiment, a system for powering vehicles includes a first wayside station and a second wayside station. The first wayside station is configured to provide electrical power to an electric vehicle. The second wayside station is configured to provide electrical power to the electric vehicle and is spaced apart from the first wayside station. One or both of the first and second wayside stations respectively comprise one or more of the following: an energy storage device for storing electrical energy, a first power transfer system, or a second power transfer system. The storage device has a maximum capacity of no more than a mean power demand of the wayside station, or no more than the mean power demand plus ten percent. The first power transfer system is configured to control transfer of electrical power between the first and second wayside stations. The second power transfer system is configured to control transfer of electrical power from one or more external sources to one or more of the first and second wayside stations. The first power transfer system and/or the second power transfer system are configured to control the transfer of electrical power based on one or more of: one of the wayside stations having a present demand or expected demand that exceeds a present capacity or an expected capacity of the wayside station; or a cost determination of one or more costs associated with electrical power provided from the energy storage device, electrical power provided between the wayside stations, or electrical power provided from the one or more external sources.

In another aspect, the system also includes a communication system that is configured to at least one of: communicate between the wayside stations for exchange of information relating to the present demand, the expected demand, the present capacity, the expected capacity, or the cost determination; communicate between one or more of the wayside stations and one or more electric vehicles, for exchange of information relating to the cost determination, to expected or present power demands of the vehicles, and/or to movement of the vehicles; communicate between one or more of the wayside stations and the one or more external sources, for exchange of information relating to the present demand, the expected demand, the present capacity, the expected capacity, the cost determination, or electrical power available from the one or more sources; or communicate between one or more of the wayside stations and a central location, for exchange of information relating to any of the foregoing.

In another embodiment, a system for controlling an electric vehicle includes a control module configured to be operably coupled with the electric vehicle and to generate signals for controlling at least one of tractive effort of the electric vehicle or a source of electrical power for the vehicle based on one or more of: (a) one or more onboard parameters comprising: a schedule of the vehicle; a location of the vehicle with respect to wayside stations along a route of the vehicle, the wayside stations configured to provide electrical power to the vehicle; a maximum capacity and/or a present capacity of an energy storage device on board the vehicle; one or more costs associated with powering the vehicle using energy from a first onboard source comprising an energy storage device; or one or more parameters relating to powering the vehicle using energy from one or more second onboard sources different from the energy storage device; or (b) one or more off-board parameters comprising: cost information associated with powering the vehicle using energy from the wayside stations; locations of the wayside stations; or a present and/or an expected capacity of the wayside stations for providing electrical power to the vehicle.

In another embodiment, another system (e.g., for controlling a vehicle) includes a controller and an energy management system. The controller is configured to be disposed onboard a first vehicle that includes one or more motors that propel the vehicle along a route during a trip, an onboard energy storage device for storing at least some of the electric energy used to power the one or more motors, and a power interface device that receives electric current from at least one of a catenary or an electrified rail. The energy management system is configured to be communicatively coupled with the controller. The energy management system also is configured to determine a stored amount of electric energy that is stored in the onboard energy storage device and to receive a requested amount of electric energy from a second vehicle. The energy management system is further configured to compare the stored amount of electric energy with the requested amount of electric energy and, based on this comparison, transmit at least some of the stored amount of electric energy to the second vehicle through the power interface device and the at least one of the catenary or electrified rail.

In another aspect, the energy management system is configured to determine a needed amount of electric energy to power the one or more motors and propel the first vehicle to a designated location. The energy management system is further configured to compare the stored amount of electric energy, the needed amount of electric energy, and the requested amount of electric energy to determine whether to transmit the at least some of the stored amount of electric energy to the second vehicle.

In another aspect, the energy management system is configured to direct the energy storage device to transmit the at least some of the stored amount of electric energy when the energy storage device will have sufficient remaining electric energy stored in the energy storage device to reach a designated location after transmitting the at least some of the stored electric energy to the second vehicle.

In another embodiment, another control system includes a controller and a charge management system. The controller is configured to be disposed at a wayside station having an off-board energy source that charges an onboard energy storage device of a vehicle traveling along a route during a trip. The controller also is configured to communicate with the vehicle as the vehicle travels along the route in order to determine a demanded amount of electric energy from the vehicle. The charge management system is configured to be communicatively coupled with the controller and the off-board energy source of the wayside station. The charge management system also is configured to at least one of generate or modify an energy allocation plan that designates how much of the electric energy is to be allocated in association with the off-board energy source, for use in charging the onboard energy storage device of the vehicle, at one or more different time periods.

This written description uses examples to disclose the inventive subject matter to enable a person of ordinary skill in the relevant art to practice the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc. are used to distinguish one element from another.

The invention claimed is:

1. A control system comprising:
a controller configured to be disposed onboard a vehicle that includes one or more motors that propel the vehicle along a route during a trip and an onboard energy storage device for storing at least some of the electric energy used to power the one or more motors, the controller configured to control operations of the one or more motors according to a trip plan that designates operational settings of the one or more motors during the trip; and
an energy management system configured to be disposed onboard the vehicle and to:
calculate estimated electric loads of powering the one or more motors over one or more segments of the trip according to the designated operational settings of the trip plan;
determine a demanded amount of electric energy for powering the vehicle based on one or more of the estimated electric loads, the demanded amount of electric energy based on a stored amount of electric energy in the onboard energy storage device;
determine at least one of total energy storage capacities or available energy storage capacities of plural upcoming wayside stations disposed along the route;
for each of two or more of the wayside stations, determine an additional estimated electric load representative of an amount of the electric energy used to propel the vehicle to the wayside station;
compare the at least one of the total energy storage capacities or the available energy storage capacities of the wayside stations;
communicate a request to one or more of the wayside stations, the request designating the demanded amount of electric energy that the energy management system determined and that is to be provided to the vehicle when the vehicle arrives at the one or more of the wayside stations so that the one or more of the wayside stations has sufficient electric energy to charge the onboard energy storage device with the electric energy to meet the one or more of the estimated electric loads;
at least one of generate or modify the trip plan based on the additional estimated electric loads and the at least one of the total energy storage capacities or the available energy storage capacities of the wayside stations that are compared; and
determine whether there is sufficient electric energy stored onboard the vehicle to power the vehicle to at Least one of the wayside stations,
wherein, responsive to the energy management system determining that there is insufficient electric energy stored onboard the vehicle to power the vehicle to at least one of the wayside stations, the energy management system is configured to direct the controller to change how the vehicle is controlled to ensure that the vehicle can travel to the at least one of the wayside stations by one or more of changing which onboard energy source provides electric energy to the vehicle, reducing speed of the vehicle, or obtaining additional electric energy from one or more of the wayside stations,
wherein the vehicle is a rail vehicle configured to also be powered from electric current received through at least one of an electrified rail or a catenary, and wherein at least one of the estimated electric loads that is calculated by the energy management system represents an amount of electric energy that is calculated to be consumed to propel the rail vehicle through an unpowered segment of the route from a first powered segment to a second powered segment, the first and second powered segments representing portions of the route that have the at least one of the electrified rail or the catenary extending alongside the route for at least one of charging the onboard power source or powering the one or more motors, the unpowered segment of the route not having the at least one of the electrified rail or the catenary extending alongside the route for charging the onboard power source or powering the one or more motors.

2. The control system of claim 1, wherein the energy management system is configured to compare the one or more of the estimated electric loads with the stored amount of electric energy in the onboard energy storage device and to change one or more of the operational settings of the trip plan based on a difference between the one or more estimated electric loads and the stored amount of electric energy.

3. The control system of claim 2, wherein the energy management system is configured to change the one or more of the operational settings of the trip plan for an upcoming portion of the trip to reduce the estimated electric load for the upcoming portion of the trip when the estimated electric load exceeds the stored amount of electric energy for the upcoming portion of the trip.

4. The control system of claim 1, wherein the estimated electric loads are associated with electric loads used to power the vehicle to different designated locations along the route, and the energy management system is configured to compare the estimated electric loads and to at least one of generate or modify the trip plan based on the estimated electric loads so that the vehicle has sufficient electric energy stored in the onboard power source to travel to the designated location associated with at least one of the estimated electric loads.

5. The control system of claim 1, wherein the energy management system is configured to at least one of generate or modify the trip plan so that there is sufficient electric energy available to the vehicle to travel to the wayside stations having a lower cost of charging the onboard energy storage device relative to one or more other wayside stations.

6. The control system of claim 1, wherein the energy management system is configured to calculate the estimated electric loads based on one or more of transportation network congestion that is representative of an amount of vehicular traffic in a transportation network that includes the route, a scheduled time of arrival of the vehicle at one or more designated locations, a grade of one or more segments of the route, a speed limit associated with one or more segments of the route, a size of the vehicle, a weight of the vehicle, a power output of the vehicle, or a rate of electric energy consumption of the vehicle.

7. The control system of claim 1, wherein the energy management system is configured to calculate the estimated electric Loads based on charging restrictions that limit at least one of when the vehicle can obtain additional electric energy to charge the onboard energy storage device, where the vehicle can obtain additional electric energy to charge the onboard energy storage device, or how much additional electric energy the vehicle can obtain to charge the onboard energy storage device.

8. The control system of claim 7, wherein the charging restrictions include one or more of a distance along the route to the wayside charging stations, amounts of reserve electric energy at the wayside stations that will be available for the vehicle to charge the onboard energy storage device when the vehicle arrives at the wayside stations, or financial costs of charging the onboard energy storage device at the wayside stations.

9. The control system of claim 1, wherein the trip plan directs the vehicle to automatically switch between powering the one or more motors using the electric energy stored in the onboard energy storage device and powering the one or more motors using electric energy generated onboard the vehicle from a generator.

10. The control system of claim 1, wherein the operational settings of the trip plan include at least one of throttle settings, power outputs, or speeds of the vehicle.

11. The control system of claim 1, wherein the energy management system is configured to communicate an estimated time of arrival with the demanded amount of electric energy to the one or more of plural wayside stations disposed along the route so that the wayside stations have sufficient electric energy to charge the onboard energy storage device of the vehicle when the vehicle arrives.

12. The control system of claim 1, wherein the vehicle includes plural cars interconnected with each other as a consist, with the controller configured to be disposed onboard a first car of the plural cars and the energy storage device configured to be disposed onboard a different, second car of the plural cars.

* * * * *